(12) United States Patent
Zhang

(10) Patent No.: US 11,971,154 B2
(45) Date of Patent: Apr. 30, 2024

(54) SPLICE PANEL ASSEMBLY, BACKLIGHT MODULE AND DISPLAY DEVICE

(71) Applicant: Hubei Yangtze Industrial Innovation Center Of Advanced Display Co., Ltd., Wuhan (CN)

(72) Inventor: Kaikai Zhang, Wuhan (CN)

(73) Assignee: Hubei Yangtze Industrial Innovation Center Of Advanced Display Co., Ltd., Wuhan (CN)

( * ) Notice: Subject to any disclaimer, the term of this patent is extended or adjusted under 35 U.S.C. 154(b) by 0 days.

(21) Appl. No.: 18/063,061

(22) Filed: Dec. 7, 2022

(65) Prior Publication Data

US 2023/0122136 A1   Apr. 20, 2023

(30) Foreign Application Priority Data

Dec. 31, 2021   (CN) .......................... 202111671984.2

(51) Int. Cl.
*F21V 19/00*   (2006.01)
*F21V 23/06*   (2006.01)
*F21Y 105/16*   (2016.01)
*F21Y 115/10*   (2016.01)

(52) U.S. Cl.
CPC .......... *F21V 19/0025* (2013.01); *F21V 23/06* (2013.01); *F21Y 2105/16* (2016.08); *F21Y 2115/10* (2016.08)

(58) Field of Classification Search
CPC .. F21V 19/0025; F21V 23/06; F21Y 2105/16; F21Y 2115/10
See application file for complete search history.

(56) References Cited

U.S. PATENT DOCUMENTS

| | | | |
|---|---|---|---|
| 2020/0388636 A1* | 12/2020 | Yueh | H01L 27/124 |
| 2021/0116749 A1* | 4/2021 | Kao | G02F 1/133602 |
| 2022/0262891 A1* | 8/2022 | Liang | G06F 3/1446 |

FOREIGN PATENT DOCUMENTS

| | | | | |
|---|---|---|---|---|
| CN | 202065941 U | 12/2011 | | |
| CN | 111384067 A | * 7/2020 | ........... | H01L 27/124 |
| CN | 111384067 A | 7/2020 | | |
| CN | 116153961 A | * 5/2023 | | |
| WO | WO-2021170669 A1 | * 9/2021 | ................ | F21S 2/00 |

OTHER PUBLICATIONS

English translation of LiuCN-111384067-A, published Jul. 2020 (Year: 2020).*
English translation of Lou CN-116153961-A, published May 2023 (Year: 2023).*

* cited by examiner

*Primary Examiner* — Evan P Dzierzynski
(74) *Attorney, Agent, or Firm* — KILPATRICK TOWNSEND & STOCKTON LLP

(57) ABSTRACT

Provided are a splice panel assembly, a backlight module and a display device. The splice panel assembly includes a plurality of light-emitting panels. Each light-emitting panel includes a base substrate. The front face of the base substrate is provided with a plurality of light-emitting elements arranged in an array. The side face of the base substrate is provided with at least one connection electrode. The light-emitting elements are electrically connected to the at least one connection electrode. The front face is connected to and not parallel to the side face. Two adjacent light-emitting panels are electrically connected to each other by the at least one connection electrode.

19 Claims, 28 Drawing Sheets

SPLICE PANEL ASSEMBLY, BACKLIGHT MODULE AND DISPLAY DEVICE

CROSS-REFERENCE TO RELATED APPLICATION

This application claims priority to Chinese Patent Application No. 202111671984.2 filed Dec. 31, 2021, the disclosure of which is incorporated herein by reference in its entirety.

FIELD

Embodiments of the present disclosure relate to the field of display technology and, in particular, to a splice panel assembly, a backlight module and a display device.

BACKGROUND

The backlight module is one of key components of the liquid crystal display (LCD) and can supply sufficient brightness and uniformly distributed light sources and the LCD can display images normally.

With the emergence of large-size display screens, large-size backlight modules which provide light sources for large-size LCD displays emerge. In the related art, a large-size backlight module is usually formed through splicing a plurality of small-size backlight module structures. To ensure the consistency of light sources provided by the backlight module, it is necessary to interconnect the small-size backlight module structures through corresponding electrodes. This poses a huge challenge to the arrangement of electrodes in the backlight module and the small-size backlight module structures. Therefore, how to ensure the light-emitting consistency of splice assemblies on the premise of simplifying the structure of assembles has become a problem that needs to be solved urgently.

SUMMARY

In response to the above problems, embodiments of the present disclosure provide a splice panel assembly, a backlight module and a display device to simplify the structure of light-emitting panels connected to each other and ensure the display uniformity of the light-emitting panels.

Some embodiments of the present disclosure provide the splice panel assembly. The splice panel assembly includes a plurality of light-emitting panels.

The plurality of light-emitting panels includes a base substrate. The front face of the base substrate is provided with a plurality of light-emitting elements arranged in an array. The side face of the base substrate is provided with at least one connection electrode. The plurality of light-emitting elements are electrically connected to the at least one connection electrode. The front face is connected to the side face and not parallel to the side face.

Two adjacent light-emitting panels of the plurality of light-emitting panels are electrically connected to each other by the at least one connection electrode.

Some embodiments of the present disclosure further provide the backlight module. The backlight module includes the preceding splice panel assembly.

Some embodiments of the present disclosure further provide the display device. The display device includes a display panel and the preceding backlight module. The backlight module is configured to provide backlight for the display panel.

DETAILED DESCRIPTION

Figure 1:
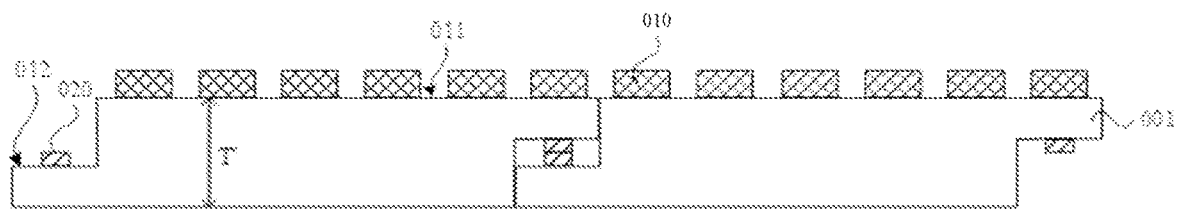
FIG. 1 is a diagram illustrating the structure of a splice panel assembly in the related art.

The present disclosure is further described hereinafter in detail in conjunction with drawings and embodiments. It is to be understood that embodiments described hereinafter are merely intended to explain the present disclosure and not to limit the present disclosure. Additionally, it is to be noted that for ease of description, only part, not all, of structures related to the present disclosure are illustrated in the drawings.

FIG. 1 is a diagram illustrating the structure of a splice panel assembly in the related art. In the related art, the splice panel assembly is spliced by a plurality of light-emitting panels. Each light-emitting panel includes a base substrate 001 and light-emitting elements 010 and connection electrodes 020 which are located on the substrate 001. The substrate 001 includes a light-emitting element setting face 011 and electrode setting faces 012. The light-emitting element setting face 011 and the connection electrode setting faces 012 are parallel but not coplanar and the substrate 001 has a Z-shaped structure. The light-emitting panels can be interconnected by connection electrodes 020 on connection electrode setting faces 012 to ensure seamless splicing between the light-emitting panels.

However, in the related art, for the substrate 001 to form a Z-shaped structure, the substrate 001 needs to have a thicker thickness T' for setting the connection electrodes 020 and light-emitting elements 010. Therefore, it is not conducive to the thinning of the light-emitting panels, and then is not conducive to the thinning of the splice panel assembly. At the same time, the preparation method of the substrate 001 having the Z-shaped structure is complicated, so the technique process is not conducive to simplifying and the cost is not conducive to reducing.

Embodiments of the present disclosure provide a splice panel assembly. The splice panel assembly includes a plurality of light-emitting panels. Each light-emitting panel includes a base substrate. The front face of the base substrate is provided with a plurality of light-emitting elements arranged in an array. The side face of the base substrate is provided with at least one connection electrode. The elements are electrically connected to the at least one connection electrode. The front face is connected to the side face and not parallel to the side face. Two adjacent light-emitting panels are electrically connected to each other by the at least one connection electrode.

According to the preceding embodiments, on the one hand, the connection electrodes of the light-emitting panels are disposed on side faces of base substrates and when the light-emitting panels are spliced, the connection electrodes on the side faces of adjacent light-emitting panels are in contact with each other, that is, the interconnection between the light-emitting panels can be achieved. Therefore, the connection between the light-emitting panels can be simplified on the premise that the dark region between two adjacent light-emitting panels is reduced. On the other hand, the connection electrodes are disposed on the side face which is connected to and not parallel to the front face where light-emitting elements are located, there is no need to reserve setting positions on the front face that the light-emitting elements are located on for the connection electrodes. This is conducive to the narrow frame of the light-emitting panels and improving the display light-emitting uniformity of the splicing panel assembly. At the same time, the connection electrodes are disposed on the side face which is connected to and not parallel to the front face where the light-emitting elements are located, so there is no need to add a corresponding step face for setting the connection electrodes. Therefore, the thickness of the base substrate does not need to be considered, which is conducive to the thinning of the splice panel assembly and simplifying the structure of the splice panel assembly.

The preceding is one embodiment of the present disclosure. Embodiments of the present disclosure are described clearly and completely hereinafter in conjunction with the drawings in the embodiments of the present disclosure.

Figure 2:
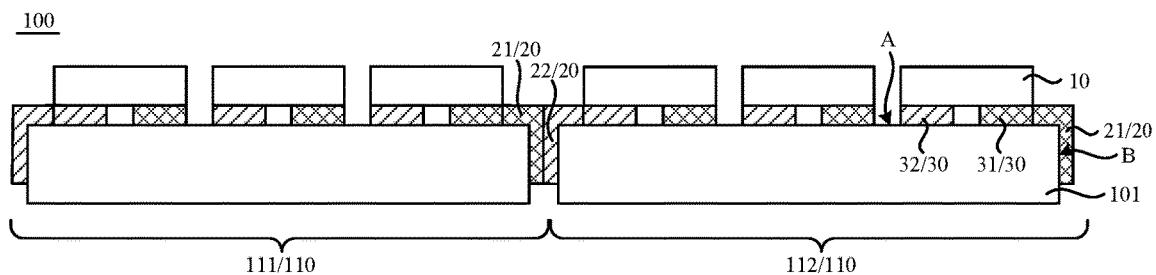
FIG. 2 is a diagram illustrating the structure of a splice panel assembly according to embodiments of the present disclosure.

FIG. 2 is a diagram illustrating the structure of a splice panel assembly according to embodiments of the present disclosure. As shown in FIG. 2, the splice panel assembly 100 includes a plurality of light-emitting panels 110. Each light-emitting panel 110 includes a base substrate 101. The front face A of the base substrate 101 is provided with a plurality of light-emitting elements 10 arranged in an array. The side face B of the base substrate 101 is provided with at least one connection electrode 20. The plurality of light-emitting elements 10 are electrically connected to the at least one connection electrode 20. The front face A is connected to the side face B and not parallel to the side face B. Two adjacent light-emitting panels 110 are electrically connected to each other by the at least one connection electrode 20.

In the light-emitting panel 110, the light-emitting elements 10 disposed on the front face A of the base substrate 101 are electrically connected to the connection electrode disposed on the side face B of the base substrate 101. For example, the light-emitting elements 10 located in the same row and/or the same column may be connected to one connection electrode 20, or all the light-emitting elements 10 are electrically connected to the same connection electrode 20. The light-emitting panels 110 may be provided as required, and the embodiments of the present disclosure are not specifically limited thereto.

Two adjacent light-emitting panels 110 are electrically connected by the connection electrodes 20 on the side faces B of respective base substrates 101. For example, the connection electrode 20 on the side face B of the base substrate 10 in the light-emitting panel 111 is in contact with the connection electrode 20 on the side face B of the base substrate 10 in the light-emitting panel 112 to achieve the electrical connection between the light-emitting panel 111 and the light-emitting panel 112. In this case, signal transmission can be performed between the light-emitting panel 111 and the light-emitting panel 112 and the light-emitting elements 10 in the light-emitting panel 111 and the light-emitting elements 10 in the light-emitting panel 112 can be synchronously controlled. Therefore, the light-emitting panels 110 in the splice panel assembly 100 can display and emit light synchronously, to improve the display uniformity of the splice panel assembly 100.

In embodiments of the present disclosure, the front face A and the side face B of the base substrate 101 are two faces connected to but not parallel to each other. Compared with the case where connection electrodes and light-emitting elements are disposed on the front face of the base substrate, the connection electrode 20 is disposed on the side face B which is connected to and not parallel to the front face A where the light-emitting elements 10 are located, to facilitate the narrow frame of the light-emitting panels 110. Therefore, when the light-emitting panels 110 are spliced as the splice panel assembly 100, the dimension of dark region between two adjacent light-emitting panels 110 of the splice panel assembly 100 is small and the splice panel assembly 100 spliced by the light-emitting panels 110 has a higher display uniformity. At the same time, compared with the related art in which the setting face of light-emitting elements and the setting face of connection electrodes are parallel to each other but not coplanar, when the connection electrode 20 is disposed on the side face B which is connected to and not parallel to the front face A where the light-emitting elements 10 are located, the base substrate 101 does not need to form a corresponding step structure. Therefore, thicker thickness is not required, and step processing is not required for the base substrate 101. This is conducive to the structure of the light-emitting panels and the thinning of the light-emitting panels 110, to facilitate the simplification of the structure of the splice panel assembly 100 and the thinning of the splice panel assembly 100.

It is to be noted that the splice panel assembly provided by the embodiments of the present disclosure includes a plurality of light-emitting panels, that is, the number of light-emitting panels may be two or more, which is not specifically limited by the embodiments of the present disclosure. For ease of description, unless otherwise specified, the embodiments of the present disclosure takes two light-emitting panels in the splice panel assembly as an example for exemplarily describing the embodiments of the present disclosure.

Figure 3:
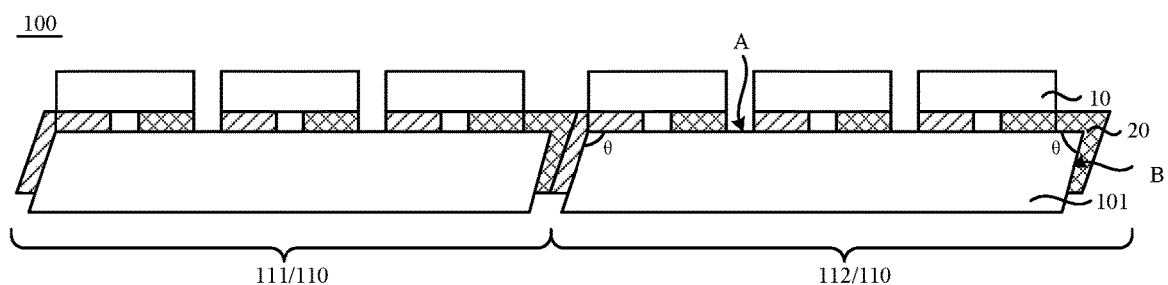
FIG. 3 is a diagram illustrating the structure of another splice panel assembly according to embodiments of the present disclosure.

In addition, in the embodiments of the present disclosure, the front face A and the side face B of the base substrate 101 are two faces connected to but not parallel to each other. That is, as shown in FIG. 2, the front face A of the base substrate 101 and the side face B thereof may be two faces which are perpendicular to each other. In one embodiment, as shown in FIG. 3, the internal angle θ formed by the front face A and the side face B of the base substrate 101 may be any angle not equal to 180° or 0°, which may be designed as required and is not specifically limited by the embodiments of the present disclosure. For ease of description, unless otherwise specified, an example shown in FIG. 2 is used in the embodiments of the present disclosure for exemplarily describing the embodiments of the present disclosure.

It is to be understood that the base substrate 101 may include a plurality of side faces B connected to and not parallel to the front face A. Taking the shape of the base substrate 101 as a cuboid as an example, the base substrate 101 includes four side faces B connected to the front face A. The connection electrode 20 may be disposed on one side face B, or the connection electrodes 20 may be disposed on two opposite side faces B respectively, or the connection electrodes may be disposed on two adjacent side faces B respectively, or the connection electrodes may be disposed on three adjacent side faces B respectively, or the connection electrodes may be disposed on all side faces B respectively. The setting mode and position of the connection electrode may be set according to actual needs, which are not specifically limited by the embodiments of the present disclosure. For ease of description, unless otherwise specified, the connection electrodes 20 in FIG. 2 are disposed on two opposite side faces B as an example in the embodiments of the present disclosure for exemplarily describing the embodiments of the present disclosure.

The connection electrodes 20 disposed on the side faces B of the base substrate 101 may be prepared through spraying coat or the like, and the material of the connection electrodes 20 includes, but is not limited to, a material having strong electrical conductivity such as silver.

Figure 4:
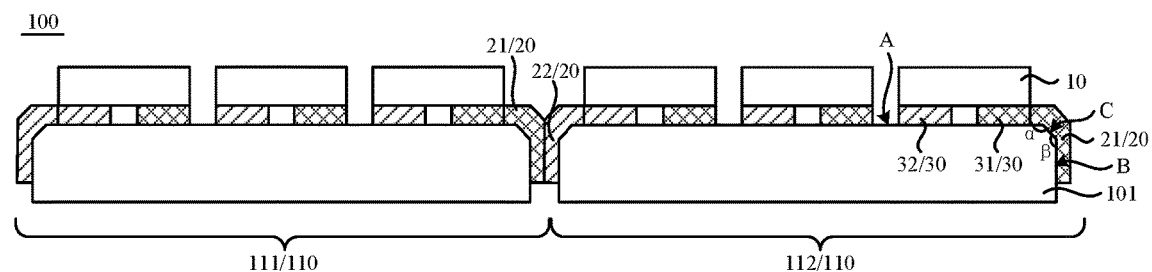
FIG. 4 is a diagram illustrating the structure of another splice panel assembly according to embodiments of the present disclosure.

In one embodiment, FIG. 4 is a diagram illustrating the structure of another splice panel assembly according to embodiments of the present disclosure. As shown in FIG. 4, the base substrate 101 further includes ramp faces C. Each ramp face C is located between the front face A and the side face B. Moreover, each ramp face C is connected to the front face A and the side face B, separately. The internal angle $\beta$ formed by the ramp face C and the side face B and the internal angle $\alpha$ formed by the ramp face C and the front face A are each an obtuse angle. The connection electrode 20 extends from the side face B to the ramp face C and is electrically connected to the light-emitting elements 10 on the front face A.

In this manner, the internal angle $\beta$ formed by the ramp face C and the side face B is an obtuse angle. When the connection electrode 20 is formed through spraying coat or the like, it can ensure that the material of the sprayed connection electrode 20 adheres to the ramp face C and the side face B at the same time and the connection electrode 20 is formed on the ramp face C and the side face B at the same time, to facilitate to simplify the preparation technique of the connection electrode 20, and thus the preparation technique of the light-emitting panel 110 is simplified, that is, the technique process of the splice panel assembly 100 spliced by the light-emitting panels 110 is simplified. At the same time, compared with the case where the connection electrode 20 extends directly from the side face B to the front face A and is electrically connected to the light-emitting elements 10 on the front face A, it is possible to prevent the connection electrode 20 from having a relatively high line breaking risk due to a sudden corner at the connection of the side face B and the front face A. In the embodiments of the present disclosure, since the internal angle $\beta$ formed by the ramp face C and the side face B is an obtuse angle, the connection electrode 20 can have a relatively small corner when extending from the side face B to the ramp face C, to reduce the line breaking risk of the connection electrode 20. Moreover, the internal angle $\alpha$ formed by the front face A and the ramp face C is also an obtuse angle and the line breaking risk of the connection electrode 20 can be reduced similarly when the connection electrode 20 extends from the ramp face C to electrically connect to the light-emitting elements 10 on the front face A.

Figure 5:
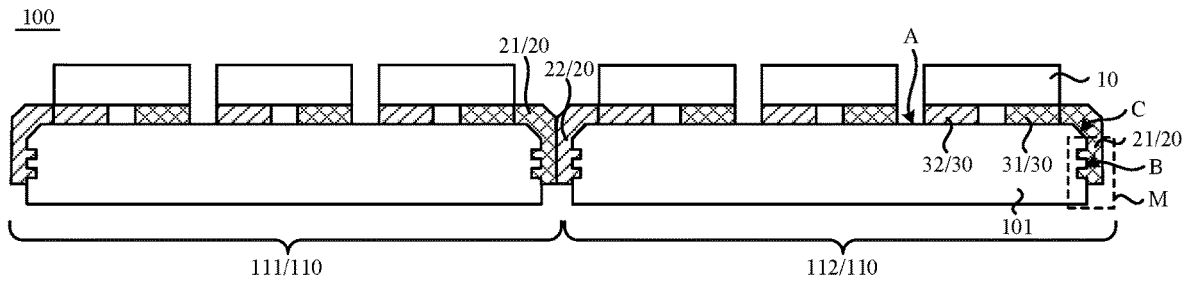
FIG. 5 is a diagram illustrating the structure of another splice panel assembly according to embodiments of the present disclosure.
Figure 6:
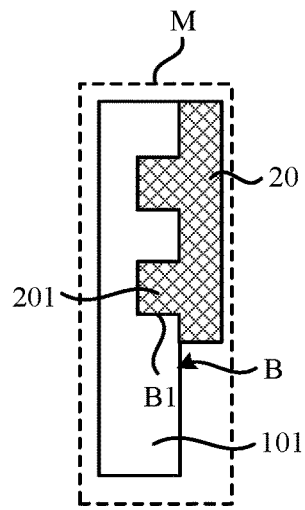
FIG. 6 is an enlarged view illustrating the structure of region M in FIG. 5.

In one embodiment, FIG. 5 is a diagram illustrating the structure of another splice panel assembly according to embodiments of the present disclosure, and FIG. 6 is an enlarged view illustrating the structure of region M in FIG. 5. With reference to FIG. 5 and FIG. 6, the side face B of the base substrate 101 includes at least one first groove B1. The connection electrode 20 is at least partially embedded in the first groove B1.

Exemplarily, with reference to FIG. 5 and FIG. 6, the setting position of one connection electrode 20 on the side face B of the base substrate 101 includes two first grooves B1. In this case, the connection electrode 20 includes two protrusions 201 corresponding to the two first grooves B1. The two protrusions 201 are respectively embedded in the two first grooves B1 and the connection electrode 20 and the side face of the base substrate 101 have a relatively large contact area. Moreover, embedding the connection electrode 20 into the first grooves B1 can also play a role in securing the connection electrode 20 to prevent the connection electrode 20 from falling off from the side face B of the base substrate 101, to improve the stability of the connection electrode 20 on the side face B of the base substrate 101.

In the case where the connection electrode 20 is formed through spraying coat or the like, the connection electrode 20 may be formed in the first grooves B1 through fixed-point spraying coat and the thickness of the connection electrode 20 in the first grooves B1 is greater than the thickness of the connection electrode 20 at other positions.

Figure 7:
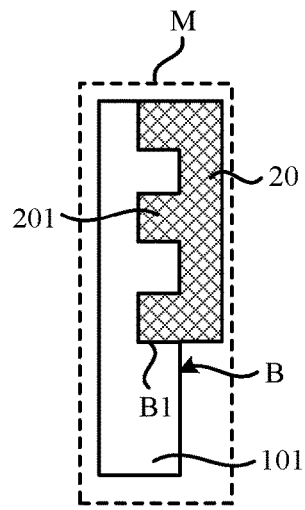
FIG. 7 is an enlarged view illustrating the structure of another region M according to embodiments of the present disclosure.
Figure 8:
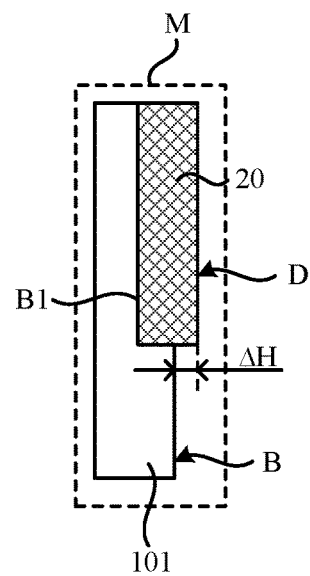
FIG. 8 is an enlarged view illustrating the structure of another region M according to embodiments of the present disclosure.

It is to be understood that FIG. 5 and FIG. 6 are only exemplary drawings of the embodiments of the present disclosure. In the embodiments of the present disclosure, one or more first grooves may be disposed on the side face of the base substrate. As shown in FIG. 7, at the setting position of the connection electrode 20, three first grooves B1 may be disposed on the side face B of the base substrate 101. In this case, the connection electrode 20 includes three protrusion structures 201 corresponding to the three first grooves B1 to respectively embed in the first grooves B1 on the side face B of the base substrate 101. In one embodiment, as shown in FIG. 8, at the setting position of the connection electrode 20, only one first groove B1 may be disposed on the side face B of the base substrate 101. In this case, the connection electrode 20 is directly embedded in the first groove B1. The number of the first grooves disposed on the side face of the base substrate may be designed according to actual needs and is not specifically limited by the embodiments of the present disclosure.

Figure 9:
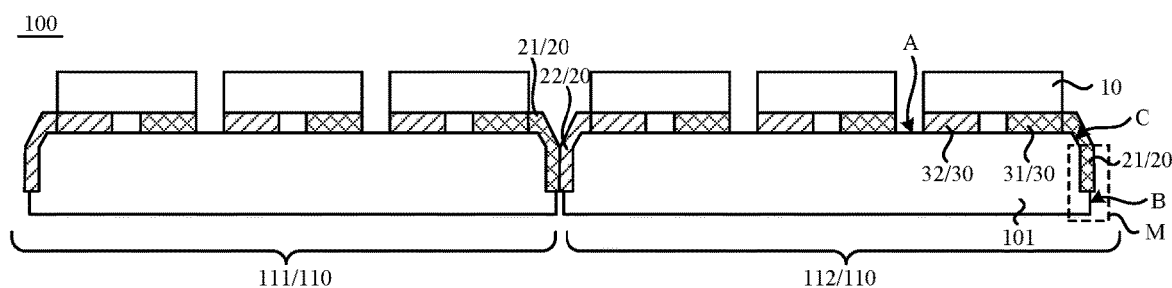
FIG. 9 is a diagram illustrating the structure of another splice panel assembly according to embodiments of the present disclosure.

In one embodiment, FIG. 9 is a diagram illustrating the structure of another splice panel assembly according to embodiments of the present disclosure. With reference to FIG. 8 and FIG. 9, in the case where the connection electrode 20 is at least partially embedded in the first groove B1 of the side face B of the base substrate 101, the height difference $\Delta H$ between the side surface D of the connection electrode 20 facing away from the side face B of the base substrate 101 and the side face B of the base substrate 101 may be less than a first height threshold. In this manner, on the premise of ensuring that the connection electrode 20 has sufficient thickness, a relatively small height difference $\Delta H$ can be made between the connection electrode 20 protruding from the first groove B1 and the side face B. Therefore, when the connection electrode of the light-emitting panel 111 is in contact with the connection electrode of the light-emitting panel 112, the gap between the light-emitting panel 111 and the light-emitting panel 112 can be reduced, to facilitate to improve the display light-emitting effect. The height difference $\Delta H$ between the surface D of the connection electrode 20 and the side face B of the base substrate 101 is a relatively small value. For example, on the premise that the connection stability can be ensured, the height difference $\Delta H$ can be set to 0 to minimize the gap between the light-emitting panel 111 and the light-emitting panel 112.

Figure 10:
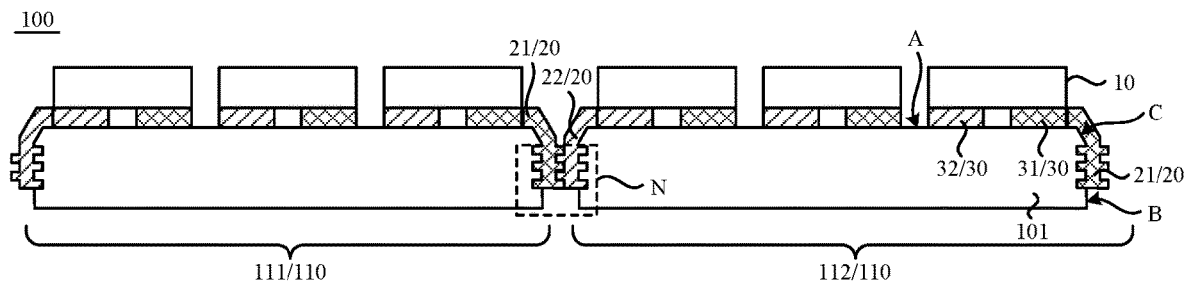
FIG. 10 is a diagram illustrating the structure of another splice panel assembly according to embodiments of the present disclosure.
Figure 11:
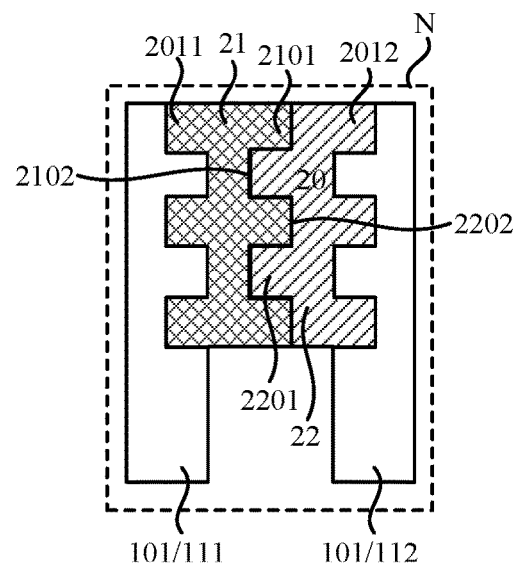
FIG. 11 is an enlarged view illustrating the structure of region N in FIG. 10.

In one embodiment, FIG. 10 is a diagram illustrating the structure of another splice panel assembly according to embodiments of the present disclosure, and FIG. 11 is an enlarged view illustrating the structure of region N in FIG. 10. With reference to FIG. 10 and FIG. 11, the side surface D of the connection electrode 20 facing away from the side face B of the base substrate 101 includes at least one of second protrusions (2101 and 2201) or second grooves (2102 and 2202). Of two adjacent light-emitting panels 111 and 112, the second projections (2101 and 2201) of the connection electrode of one light-emitting panel are embedded in the second grooves (2202 and 2102) of the connection electrode of another light-emitting panel.

Exemplarily, with reference to FIG. 10 and FIG. 11, in the light-emitting panel 111, the side surface of the connection electrode 21 facing away from the side face B of the base substrate 101 includes three second protrusions 2101 and two second grooves 2102. Moreover, in the light-emitting panel 112, the side surface of the connection electrode 22 facing away from the side face B of the base substrate 101 includes two second protrusions 2201 and three second grooves 2202. In this case, the connection electrode 21 of the light-emitting panel 111 and the connection electrode 22 of the light-emitting panel 112 adjacent to the light-emitting panel 111 are connected in such a manner that the second protrusions 2101 of the connection electrode 21 are embedded in the second grooves 2202 of the connection electrode 22, and the second protrusions 2201 of the connection electrode 22 are embedded in the second grooves 2102 of the connection electrode 21. In this manner, it is conducive to increasing the contact area of the connection electrode 21 of the light-emitting panel 111 and the connection electrode 22 of the light-emitting panel 112, and thus the contact impedance of the connection electrode 21 and connection electrode 22 can be reduced. In this case, the second protrusions (2101 and 2201) and the second grooves (2202 and 2102) may be used for alignment to avoid misalignment between the connection electrode 21 of the light-emitting panel 111 and the connection electrode 22 of the light-emitting panel 112 during splicing. Therefore, the connection stability between the connection electrode 21 and the connection electrode 22 is improved, that is, the connection stability between the light-emitting panel 111 and the light-emitting panel 112 is improved, and the service life of the splice panel assembly is improved.

The specific structure of the second protrusions (2101 and 2201) and the second grooves (2202 and 2102) includes, but is not limited to, a cuboid, a hemispherical shape, a triangular pyramid or the like, which is not specifically limited by the embodiments of the present disclosure. Meanwhile, in the embodiments of the present disclosure, the positions of the second protrusions (2101 and 2201) and the second grooves (2202 and 2102) at side surfaces of the connection electrodes (21 and 22) facing away from the side face B of the base substrate 101 can be designed as required. On the premise that the second protrusions (2101 and 2201) and the second grooves (2202 and 2102) of the two connection electrodes (21 and 22) electrically connected to each other and located in different light-emitting panels (111 and 112) form a complementary structure, this is not limited in the embodiments of the present disclosure. Exemplarily, the connection electrodes (21 and 22) include a protrusion structure embedded in the first grooves of the base substrate 101. Of the two connection electrodes (21 and 22) located in different light-emitting panels (111 and 112) and electrically connected to each other, the second protrusion 2101 of one connection electrode 21 is disposed opposite to the protrusion structure 2011 of the one connection electrode 21 embedded in a first groove, and the second protrusion 2202 of another connection electrode 22 and the protrusion structure 2012 of the another connection electrode 22 embedded in a first groove do not overlap each other in the direction perpendicular to the side face of the base substrate 101.

Figure 12:
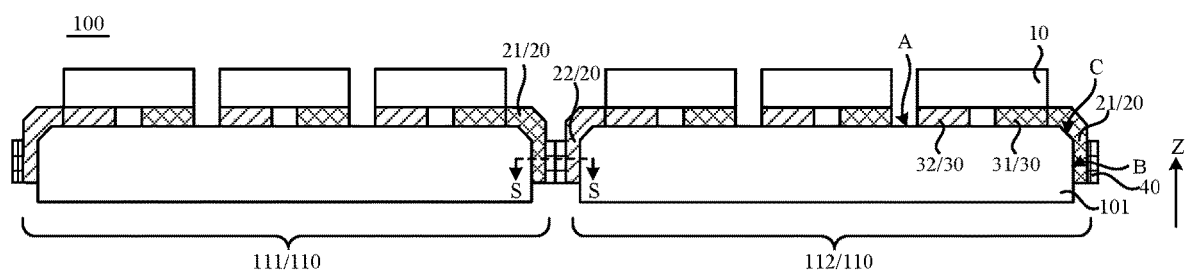
FIG. 12 is a diagram illustrating the structure of another splice panel assembly according to embodiments of the present disclosure.
Figure 13:
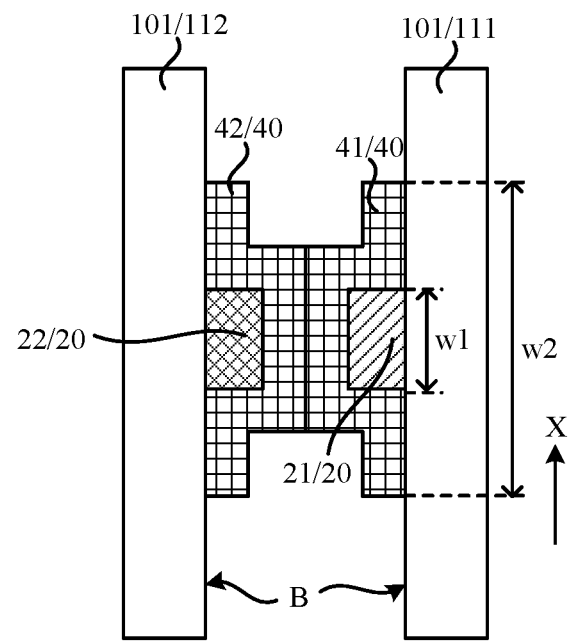
FIG. 13 is a top view illustrating the structure of section S-S in FIG. 12.

In one embodiment, FIG. 12 is a diagram illustrating the structure of another splice panel assembly according to embodiments of the present disclosure, and FIG. 13 is a top view illustrating the structure of section S-S in FIG. 12. With reference to FIG. 10 and FIG. 11, the side faces B of the base substrate 101 are further provided with conductive protection structures 40 corresponding to the connection electrodes 20 in a one-to-one manner. The conductive protection structures 40 are electrically connected to the connection electrodes 20 and cover at least part of the connection electrodes 20. The connection electrodes 20 of two adjacent light-emitting panels 110 are electrically connected to each other by conductive protection structures.

Exemplarily, with reference to FIG. 12 and FIG. 13, of two adjacent light-emitting panels 110, the side of the connection electrode 21 of the light-emitting panel 111 facing away from the side face B of the base substrate 101 of the light-emitting panel 111 is covered with a conductive protection structure 41, the side of the connection electrode 22 of the light-emitting panel 112 facing away from the side face B of the base substrate 101 of the light-emitting panel 112 is covered with a conductive protection structure 42. Moreover, the connection electrode 21 of the light-emitting panel 111 is electrically connected to the connection electrode 22 of the light-emitting panel 112 through the conductive protection structure 41 and the conductive protection structure 42. The conductive protection structure 41 can protect the connection electrode 21 and prevent the connection electrode 21 from being damaged due to collision during the splicing process of the light-emitting panel. Moreover, the conductive protection structure 41 can also secure the connection electrode 21 to an extent to prevent the connection electrode 21 from falling off from the side face B of the base substrate 101 of the light-emitting panel 111. Similarly, the conductive protection structure 42 can protect the connection electrode 22 and prevent the connection electrode 22 from being damaged due to collision during the splicing process of the light-emitting panel. Moreover, the conductive protection structure 42 can also secure the connection electrode 22 to an extent to prevent the connection electrode 22 from falling off from the side face B of the base substrate 101 of the light-emitting panel 112.

The conductive protection structures 40 corresponding to the connection electrodes 20 may cover all or part of the connection electrodes 20. This may be designed according to actual needs and is not specifically limited by the embodiments of the present disclosure.

Exemplarily, the conductive protection structures 40 may cover all connection electrodes 20 located on the side faces B of the base substrate 101, that is, the conductive protection structures 40 may cover sides of the connection electrodes 20 and the top faces adjacent to the sides and facing away from the base substrate 101. In this case, in a first direction X, the width w2 of each conductive protection structure 40 is larger than the width w1 of each connection electrode 20 and the conductive protection structures 40 have a good protection and secure effect on the connection electrodes 20. The first direction X is a direction that intersects the extension direction Z of the connection electrodes 20 and is parallel to the side face B.

Figure 14:
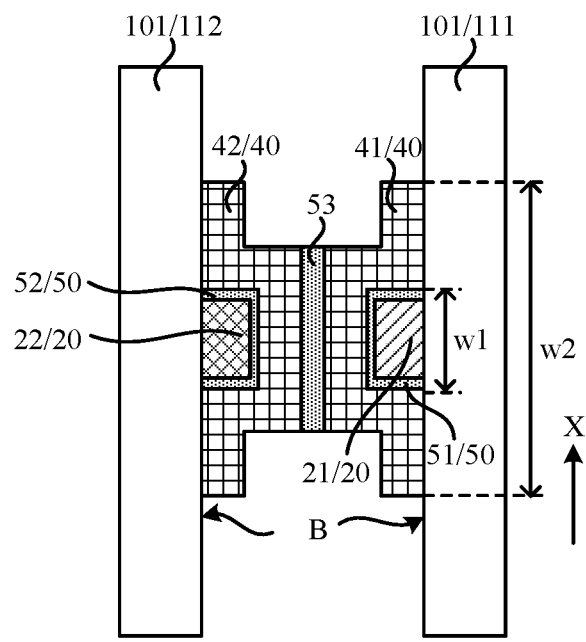
FIG. 14 is another top view illustrating the structure of section S-S in FIG. 12.

In one embodiment, FIG. 14 is another top view illustrating the structure of section S-S in FIG. 12. With reference to FIGS. 12 to 14, in the case where the connection electrodes 20 of two adjacent light-emitting panels 110 are electrically connected to each other by the conductive protection structures 40, the conductive protection structures 40 may be electrically connected to the connection electrodes 20 by conductive adhesive 50. In this manner, the connection electrodes 20 can be secured to the conductive protection structures through conductive adhesive to improve the connection stability between the conductive protection structures and the connection electrodes 20.

Exemplarily, the connection electrode 21 of the light-emitting panel 111 is electrically connected to the conductive protection structure 41 by conductive adhesive 51, and the connection electrode 21 of the light-emitting panel 112 is electrically connected to the conductive protection structure 41 by conductive adhesive 52. The conductive adhesive 51 and the conductive adhesive 52 may be conductive double-sided adhesive with a viscosity. In this case, one face of the conductive adhesive 51 adheres to the connection electrode 21, and another face of the conductive adhesive 51 adheres to the conductive protection structure 41 and the conductive protection structure 41 is attached to the connection electrode 21 through the conductive adhesive 51. Similarly, one face of the conductive adhesive 52 adheres to the connection electrode 22, and another face of the conductive adhesive 52 adheres to the conductive protection structure 42 and the conductive protection structure 42 is attached to the connection electrode 22 through the conductive adhesive 52.

In addition, the conductive adhesive 52 may be correspondingly disposed between the conductive structure 41 and the conductive structure 42 which are electrically connected to each other and the conductive structures (41 and 42) of two adjacent light-emitting panels (111 and 112) are connected by the conductive adhesive 52, to improve the connection stability of the two adjacent light-emitting panels (111 and 112). In the embodiments of the present disclosure, the connection mode of the conductive structures (41 and 42) of the two adjacent light-emitting panels (111 and 112) is not limited thereto. On the premise that the connection stability can be achieved, the connection mode can be designed according to actual needs.

Figure 15:
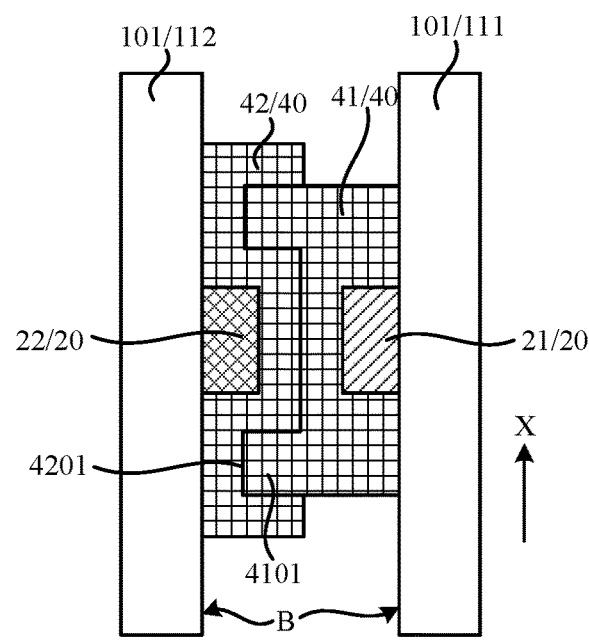
FIG. 15 is another top view illustrating the structure of section S-S in FIG. 12.

In one embodiment, FIG. 15 is another top view illustrating the structure of section S-S in FIG. 12. With reference to FIG. 12 and FIG. 15, the side surface of the conductive protection structure 40 facing away from the side face B of the base substrate 101 includes at least one of a third protrusion (4101) or a third groove (4201). Of the two adjacent light-emitting panels (111 and 112), the third protrusion (4101) of the conductive protection structure 40 (41) of one light-emitting panel (111) is embedded in the third groove (4201) of the conductive protection structure 40 (42) of another light-emitting panel (112).

Exemplarily, as shown in FIG. 13, in the light-emitting panel 111, the conductive protection structure 41 includes two third protrusions 4101. Moreover, in the light-emitting panel 1112, the conductive protection structure 42 includes two third grooves 4201. The third protrusions 4101 are embedded in the third grooves 420 in a one-to-one manner and the top and side faces of the third protrusions 4101 are in contact with the side walls and the bottom of the third grooves 4201. Thus, the contact area between the conductive protection structure 41 of the light-emitting panel 111 and the conductive protection structure 42 of the light-emitting panel 112 can be increased, and the contact impedance between the conductive protection structure 41 and the conductive protection structure 42 can be reduced. In this case, the third protrusions 4101 and the third grooves 4201 may be used for alignment to avoid misalignment between the conductive protection structure 41 of the light-emitting panel 111 and the conductive protection structure 42 of the light-emitting panel 112 during splicing. Therefore, the connection stability between the conductive protection structure 41 and the conductive protection structure 42 is improved, that is, the connection stability between the light-emitting panel 111 and the light-emitting panel 112 is improved, and the service life of the splice panel assembly is improved.

The specific structure of the third protrusions (4101) and the third grooves (4201) includes, but is not limited to, a cuboid, a hemispherical shape, a triangular pyramid or the like, which is not specifically limited by the embodiments of the present disclosure. Meanwhile, in the embodiments of the present disclosure, the positions of the third protrusions (4101) and the third grooves (4201) at side surfaces of the conductive protection structures (41 and 42) facing away from the side face B of the base substrates 101 can be designed as required. On the premise that the third protrusions (4101) and the third grooves (4201) of the two conductive protection structures (41 and 42) electrically connected to each other and located in different light-emitting panels (111 and 112) form a complementary structure, this is not limited in the embodiments of the present disclosure.

Exemplarily, as shown in FIG. 13, in the direction perpendicular to the side face B of the base substrate 101, the third protrusions (4101) and/or the third grooves (4201) of the conductive protection structures 40 do not overlap the connection electrodes 20 covered by the conductive protection structures 40 to ensure that the conductive protection structures 40 have sufficient protection to the connection electrodes 20.

Figure 16:
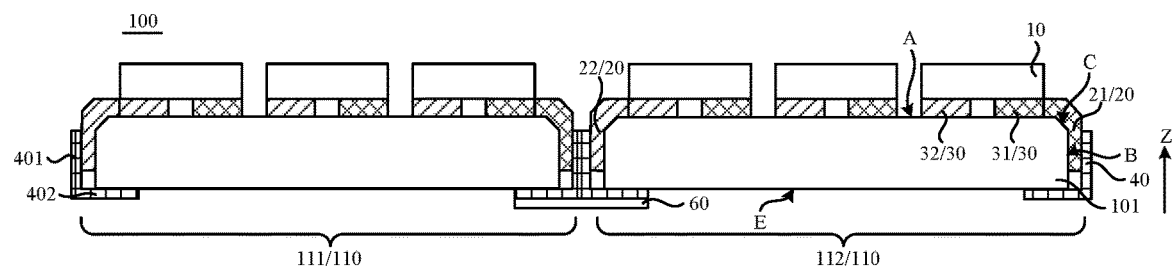
FIG. 16 is a diagram illustrating the structure of another splice panel assembly according to embodiments of the present disclosure.

In one embodiment, FIG. 16 is a diagram illustrating the structure of another splice panel assembly according to embodiments of the present disclosure. As shown in FIG. 16, each conductive protection structure 40 includes a first conductive portion 401 and a second conductive portion 402 connected to each other. The first conductive portion 401 is located on a side of the connection electrode 20 facing away from the side face B of the base substrate 101. The second conductive portion 402 is located on a side of the base substrate 101 facing away from the light-emitting elements 10. Moreover, the second conductive portion 402 is secured on the side of the base substrate 101 facing away from the light-emitting elements 10.

Exemplarily, in the conductive protection structure 40, the first conductive portion 401 extends from the side of the connection electrode 20 facing away from the side face B of the base substrate 101 to connect to the second conductive portion 402 located on the side of the base substrate 101 facing away from the light-emitting elements 10. Moreover, the second conductive portion 402 is secured to the side of the base substrate 101 facing away from the light-emitting elements 10 to ensure relatively high stability of the conductive protection structure 40 and avoid falling off of the conductive protection structure 40.

The secure mode of the second conductive portion 402 on the side of the base substrate 101 facing away from the light-emitting elements 10 may be designed as required, which the embodiments of the present disclosure is not specifically limited thereto. For example, the second conductive portion 402 may be secured to the side of the base substrate 101 facing away from the light-emitting elements 10 through corresponding fasteners or may be attached to the side of the base substrate 101 facing away from the light-emitting elements 20 through corresponding double-sided adhesive.

In one embodiment, with continued reference to FIG. 16, the splice panel assembly 100 further includes at least one conductive connection strip 60. The second conductive portions 402 of two adjacent light-emitting panels 110 are electrically connected by a conductive connection strip 60. For example, the second conductive portion 402 of the conductive protection structure 40 in the light-emitting panel 111 is electrically connected to the second conductive portion 402 of the conductive protection structure 40 in the light-emitting panel 112 by a conductive connection strip 60. Thus, the connection area of the conductive protection structures 40 of two adjacent light-emitting panels 110 can be increased, to reduce the contact impedance of the conductive protection structures 40. At the same time, the conductive connection strip 60 can also play a role in securing the conductive protection structures 40 of two adjacent light-emitting panels 110, to improve the connection stability between the conductive protection structures 40.

In the light-emitting panel 110, there may be one or more connection electrodes 20 located on the same side face B of the base substrate 101. In the case that there are a plurality of connection electrodes 20 located on the same side face B of the base substrate 101, there are a plurality of conductive protection structures 40 corresponding to the connection electrodes 20. The plurality of conductive protection structures 40 correspond to the plurality of connection electrodes 20 in a one-to-one manner.

Figure 17:
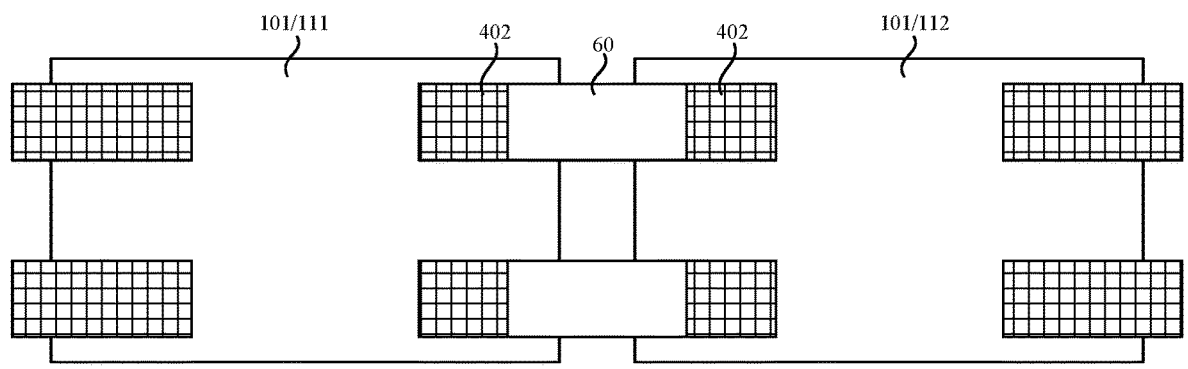
FIG. 17 is a bottom view illustrating the structure of a splice panel assembly according to embodiments of the present disclosure.

Exemplarily, FIG. 17 is a bottom view illustrating the structure of a splice panel assembly according to embodiments of the present disclosure. With reference to FIG. 16 and FIG. 17, for example, two connection electrodes 20 are disposed on the same side face B, and two conductive protection structures 40 are correspondingly disposed on the side face B to protect the two connection electrodes 20, respectively. In this case, the second conductive portions 402 of the two conductive protection structures 40 in the light emitting-panel 111 are electrically connected to the second conductive portions 402 of the two conductive protection structures 40 in the light-emitting panel 112 by two different conductive connection strips 60, respectively.

It is to be noted that FIG. 17 is only an exemplary drawing of the embodiments of the present disclosure. FIG. 17 only exemplarily shows that the number of the conductive connection strips 60 electrically connecting the second conductive portions 402 of the two adjacent light-emitting panels 111 and 112 is equivalent to the number of the interconnected conductive protection structures 40 in the two light-emitting panels 111 and 112. In the embodiments of the present disclosure, the number of the conductive connection strips 60 electrically connecting the second conductive portions 402 of the two adjacent light-emitting panels 111 and 112 may be one.

Figure 18:
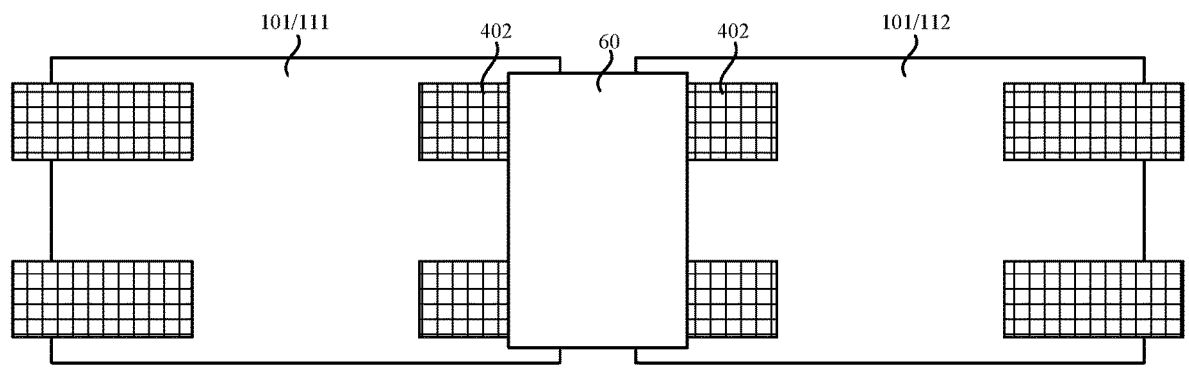
FIG. 18 is a bottom view illustrating the structure of another splice panel assembly according to embodiments of the present disclosure.
Figure 19:
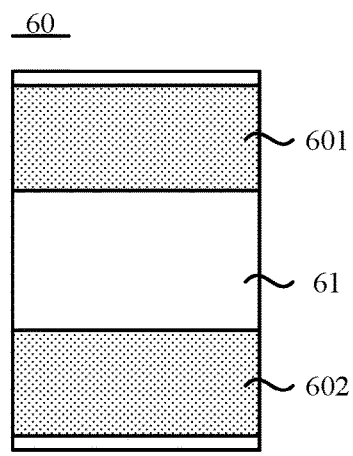
FIG. 19 is a top view illustrating the structure of a conductive connection strip according to embodiments of the present disclosure.

In one embodiment, FIG. 18 is a bottom view illustrating the structure of another splice panel assembly according to embodiments of the present disclosure, and FIG. 19 is a top view illustrating the structure of a conductive connection strip according to embodiments of the present disclosure. With reference to FIGS. 16, 18 and 19, in the case that there are a plurality of interconnected conductive protection structures 40 in the two adjacent light-emitting panels 111 and 112, each conductive connection strip 60 includes a plurality of conductive regions (601 and 602). Thus, of the two adjacent light-emitting panels 111 and 112, the second conductive portions 402 of different conductive protection structures 40 in the one light-emitting panel 111 are electrically connected to the second conductive portions 402 of different conductive protection structures 40 in the another light-emitting panel 112 by the different conductive regions (601 and 602) in a one-to-one manner.

Exemplarily, in the case that the number of the interconnected conductive protection structures 40 in the two adjacent light-emitting panels 111 and 112 is two, each conductive connection strip 60 includes two conductive regions 601 and 602. Thus, one of the second conductive portions 402 of the conductive protection structures 40 in the light-emitting panel 111 is electrically connected to one of the second conductive portions 402 of the conductive protection structures 40 in the light-emitting panel 112 by the conductive region 601. Moreover, another one of the second conductive portions 402 of the conductive protection structures 40 in the light-emitting panel 111 is electrically connected to another one of the second conductive portions 402 of the conductive protection structures 40 in the light-emitting panel 112 by the conductive region 602.

In this manner, the second conductive portions 402 of the conductive protection structures 40 share the same conductive connection strip 60 and the number of conductive connection strips 60 disposed in the splice panel assembly 100 can be reduced, to facilitate simplification of the structure of the splice panel assembly 100. Moreover, the two adjacent conductive regions (601 and 602) in the same conductive connection strip 60 are insulated from each other and signals transmitted by different conductive protection structures 40 are not interfered with each other, to improve the accuracy of the signals transmitted by the conductive protection structures 40.

The conductive connection strip 60 may include an insulating layer 61 and a conductive layer on the insulating layer 61. The conductive layer may form a plurality of conductive regions (601 and 602) insulated from each other. The formation of the conductive layer may include, but is not limited to, spraying coat or deposition. When the conductive layer is formed by spraying coat, conductive material may be sprayed and coated on the insulating layer 61 at positions corresponding to the conductive regions (601 and 602) and the conductive regions (601 and 602) having a conductive function are formed at the corresponding positions. In one embodiment, when the conductive layer is formed by deposition, a layer of conductive film may be formed on the insulating layer 61, and by patterning the conductive film, the conductive layer including the plurality of conductive regions (601 and 602) may be formed.

In the embodiments of the present disclosure, as shown in FIG. 16, the conductive connection strip 60 may be located on a side of the conductive protection structure 40 facing away from the bottom face E of the base substrate 101. The bottom face E is opposite to the front face A of the base substrate 101. In this case, the insulating layer 61 in the conductive connection strip 60 is located on a side of the second conductive portion 402 of the conductive protection structure 40 facing away from the side face B of the base substrate 101. Moreover, the conductive layer in the conductive connection strip 60 is located between the insulating layer 61 and the second conductive portion 402 of the conductive protection structure 40.

Figure 20:
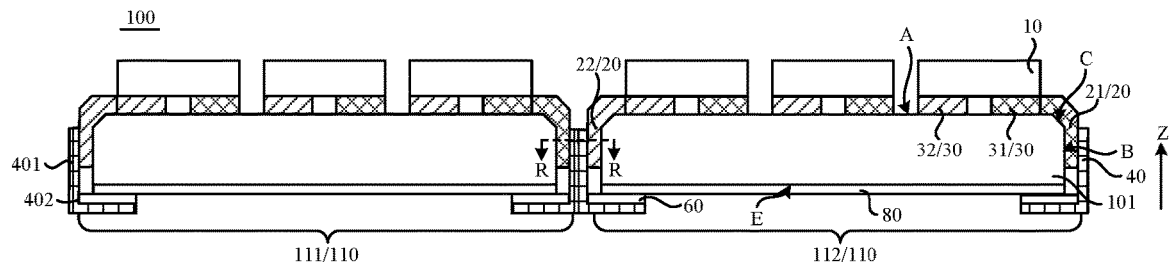
FIG. 20 is a diagram illustrating the structure of another splice panel assembly according to embodiments of the present disclosure.
Figure 21:
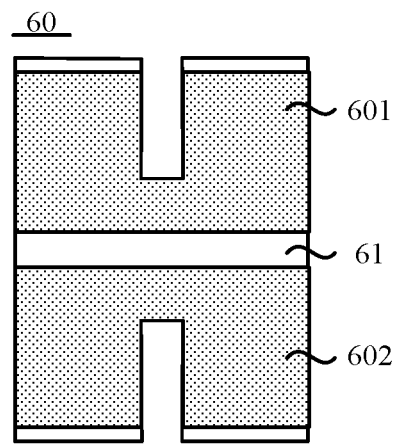
FIG. 21 is a top view illustrating the structure of another conductive connection strip according to embodiments of the present disclosure.

In one embodiment, FIG. 20 is a diagram illustrating the structure of another splice panel assembly according to embodiments of the present disclosure, and FIG. 21 is a top view illustrating the structure of another conductive connection strip according to embodiments of the present disclosure. With reference to FIG. 20 and FIG. 21, in response to the conductive connection strip 60 including the insulating layer 61 and the conductive layer which is on the insulating layer 61 and includes the plurality of conductive regions (601 and 602) insulating from each other, the insulating layer 61 may be located on a side of the second conductive portion 402 facing the base substrate 101, and the conductive layer is located between the insulating layer 61 and the second conductive portion 401. In this case, the conductive connection strip 60 may be directly formed on the base substrate 101. Thus, no additional substrate structure is provided when preparing the conductive connection strip 60, and the preparation technique of the conductive connection strip 60 is conducive to simplifying.

Figure 22:
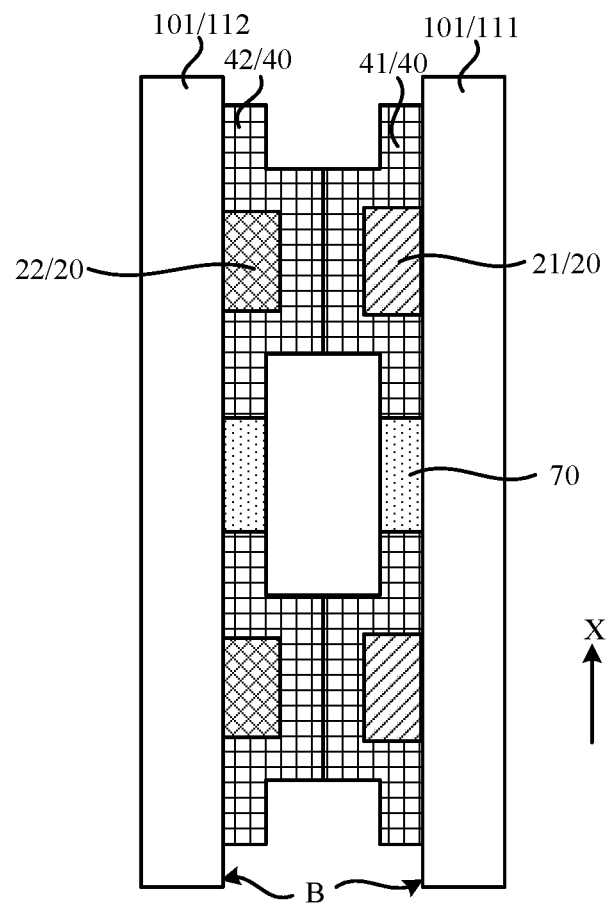
FIG. 22 is a section view illustrating the structure of section R-R in FIG. 20.

In one embodiment, FIG. 22 is a section view illustrating the structure of section R-R in FIG. 20. With reference to FIG. 20 and FIG. 22, an insulating structure 70 is disposed between two adjacent conductive protection structures 40 of the same light-emitting panel 110 to prevent the conductive protection structures 40 from being larger in width in the first direction X and two adjacent conductive protection structures 40 in the same light-emitting panel 110 are short-circuited. In the embodiments of the present disclosure, the insulating structure 70 is disposed between the two adjacent conductive protection structures 40 in the same light-emitting panel 110 and signals on the two adjacent conductive protection structures 110 in the same light-emitting panel 110 are not interfered with each other. Thus, the accuracy of the signals transmitted by the conductive protection structures 40 is conducive to improving, to improve the light-emitting stability of the light-emitting panel 110.

In one embodiment, with continued reference to FIG. 20, a reflective layer 80 is disposed on the side of the base substrate 101 facing away from the light-emitting elements 10. The reflective layer 80 can reflect light emitted from the light-emitting elements 10 and then, through the base substrate 101, reaching the bottom face E of the base substrate 101 to the front face A of the base substrate 101, to improve the utilization rate of the light emitted from the light-emitting element 10. To maximize the utilization rate of light, the reflective layer 80 may be directly attached to the bottom face E of the base substrate 101. That is, no other structure is disposed between the reflective layer 80 and the base substrate 101.

In one embodiment, with continued reference to FIG. 20, the light-emitting elements 10 in the light-emitting panel 110 may include mini LEDs or micro LEDs. In this case, the light-emitting elements 10 in the light-emitting panel 110 may be transferred to the front face of the base substrate 101 in the light-emitting panel 110 through mass transfer.

The splice panel assembly 100 is formed by splicing a plurality of light-emitting panels 110 into a panel assembly having a larger size. In this case, the light-emitting panel 110 may have a smaller size. Compared with transferring all the light-emitting elements to a panel assembly having a larger size at one time, when the mass transfer of the light-emitting elements 10 in the light-emitting panel 110 is performed, the number of transferred light-emitting elements 10 is relatively small and the difficulty of transferring the light-emitting elements 10 can be reduced, to facilitate the reduction of the preparation cost of the splice panel assembly and improving the production yield of the splice panel assembly.

In addition, when the light-emitting elements 10 are mini LEDs or micro LEDs, bonding electrodes 30 are disposed on the base substrate 101. The light-emitting elements 10 of the light-emitting panel 110 are transferred to the base substrate 101 through mass transfer and correspondingly electrically connected to the bonding electrodes 30. A light-emitting element 10 may include a first pole and a second pole. A bonding electrode 30 may include a first bonding electrode 31 and a second bonding electrode 32. The first pole of the light-emitting element 10 is correspondingly electrically connected to the first bonding electrode 31. The second pole of the light-emitting element 10 is correspondingly electrically connected to the second bonding electrode 32. Accordingly, the side face B of the base substrate 101 should be provided with a first connection electrode 21 correspondingly electrically connected to the first bonding electrode 31 and a second connection electrode 22 correspondingly electrically connected to the second bonding electrode 32.

It is to be noted that the first connection electrode 21 and the second connection electrode 22 may be located on the same side face B of the base substrate 101 or may be located on different side faces B of the base substrate 101. The first connection electrode 21 and the second connection electrode 22 may be disposed according to a specific connection mode of the light-emitting elements 10 in the light-emitting panel 110, which is not specifically limited by the embodiments of the present disclosure.

Figure 23:
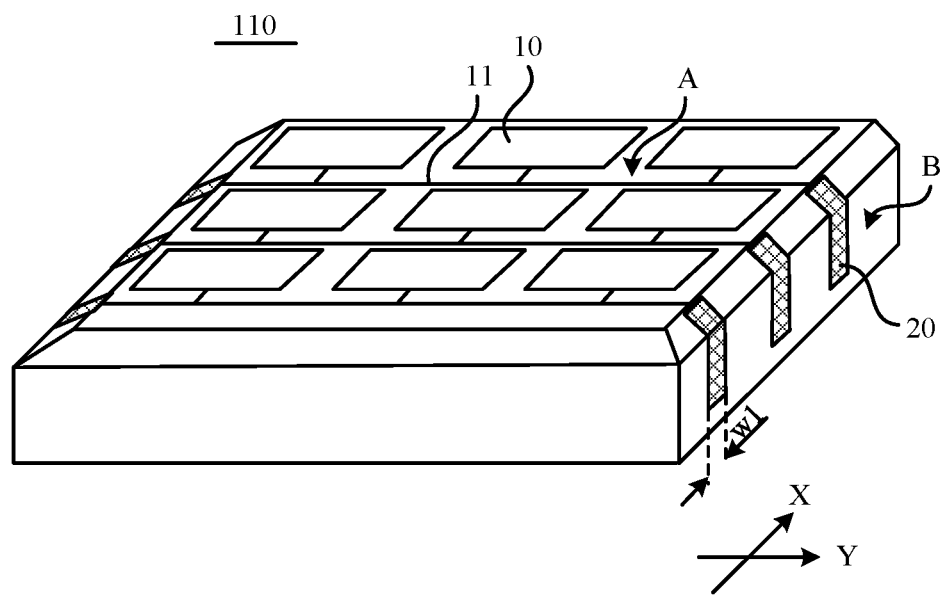
FIG. 23 is a perspective view illustrating the structure of a light-emitting panel according to embodiments of the present disclosure.

In one embodiment, FIG. 23 is a perspective view illustrating the structure of a light-emitting panel according to embodiments of the present disclosure. As shown in FIG. 23, the front face A of the base substrate 101 is provided with a plurality of signal lines 11. The light-emitting elements 10 located in the same row or the same column are electrically connected to each other by one signal line 11. The light-emitting elements 10 are electrically connected to the connection electrodes 20 by the signal lines 11. In this manner, the light-emitting elements 10 located at least in the same row or the same column are connected to one connection electrode 20 by a signal line 11. Compared with the case where each light-emitting element 10 is connected to one connection electrode 20, the number of connection electrodes 20 disposed on the side face B of the base substrate 101 in the light-emitting panel 110 can be reduced, the design of the connection electrodes 20 can be simplified, and thus the design of the light-emitting panel 110 can be simplified, to facilitate to reducing the cost of the light-emitting panel 110.

It is to be noted that FIG. 23 only exemplarily shows that the light-emitting elements 10 located in the same row or the same column are electrically connected to a connection electrode 20 by a signal line 11. While light-emitting elements located in the same row and in the same column in the embodiments of the present disclosure may be electrically connected to connection electrodes by corresponding signal lines.

Figure 24:
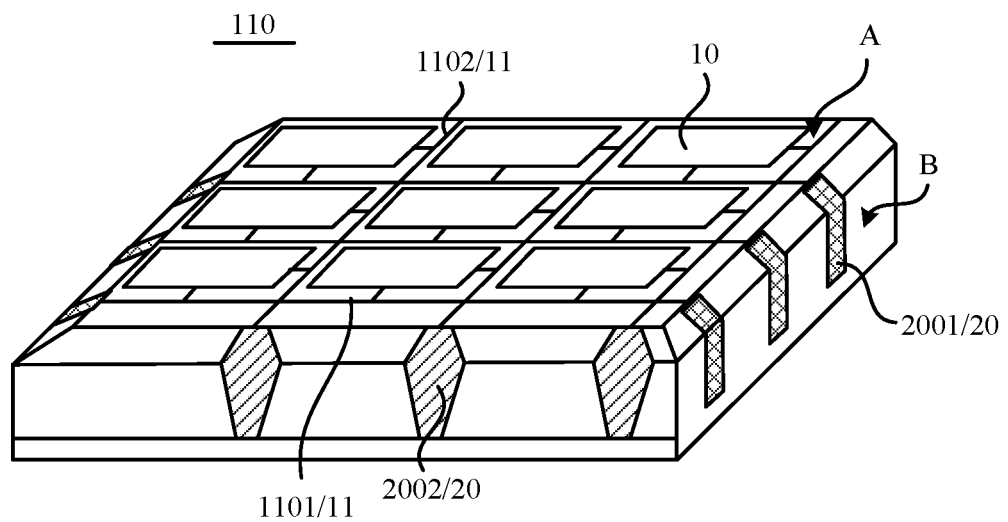
FIG. 24 is a perspective view illustrating the structure of another light-emitting panel according to embodiments of the present disclosure.

Exemplarily, FIG. 24 is a perspective view illustrating the structure of another light-emitting panel according to embodiments of the present disclosure. As shown in FIG. 24, the light-emitting elements 10 located in the same row are electrically connected to a connection electrode 2001 by a signal line 1101. Moreover, the light-emitting elements 10 located in the same column are electrically connected to a connection electrode 2002 by a signal line 1102. Signals transmitted by the connection electrode 2001 and the connection electrode 2002 may be different signals. For example, the connection electrode 2001 may transmit the signal required by the first poles of the light-emitting elements 10, and the connection electrode 2002 may transmit the signal required by the second poles of the light-emitting elements 10. In one embodiment, the signals transmitted by the connection electrode 2001 and the connection electrode 2002 may be the same signal. In this case, the light-emitting panel 110 may be separately electrically connected to other light-emitting panels located around the light-emitting panel 110 by the connection electrodes (2001 and 2002) located on different side faces B of the base substrate 101.

In one embodiment, with continued reference to FIG. 23, the width w1 of the connection electrode 20 is greater than the width of the signal line 11. The width w1 of the connection electrode 20 is the dimension of a short side of the connection electrode 20. The width of the signal line 11 is the dimension of a short side of the signal line 11.

Exemplarily, among the interconnected connection electrodes 20 and signal lines 11, when the signal lines 11 extend along a second direction Y, the width of the connection electrodes 20 and signal lines 11 may be a size in the first direction X which is parallel to the front face A and intersect the second direction.

In this manner, through setting the width of the connection electrodes 20 to be larger than the width of the signal lines 11, it is possible to avoid the connection electrode 20 which extend from the side face B to the front face A to electrically connect to the signal line 11 from breaking at the corner between the side face B and the front face A. In this case, setting the width of the connection electrodes 20 to a larger size can also be conducive to reducing the transmission impedance when the signals are transmitted on the connection electrodes 20. Moreover, setting the width of the signal lines 11 to a smaller size is conducive to reducing the occupied area of the signal lines 11, to facilitate to increase of the occupied size of the light-emitting elements 10 in the light-emitting panel 110, and further facilitating to improving the resolution of the light-emitting panel 110. The signal lines 11 and the connection electrodes 20 may be on the same film layer or different film layers, which is not specifically limited by the embodiments of the present disclosure.

It is to be understood that when the light-emitting elements located in the same row and/or the same column are electrically connected by the same signal line, the light-emitting elements located in the same row and/or the same column may be connected in series and/or in parallel. The light-emitting elements in series connection means that the first pole of a light-emitting element located in the middle is electrically connected to the second pole of the former light-emitting element by a signal line, and the second pole of the light-emitting element located in the middle is electrically connected to the first pole of the following light-emitting element by the signal line. The light-emitting elements in parallel connection means that first poles of two adjacent light-emitting elements are electrically connected by one signal line, and second poles of the two adjacent light-emitting elements are electrically connected by another signal line. Embodiments of the present disclosure are exemplarily described hereinafter for different cases.

Figure 25:
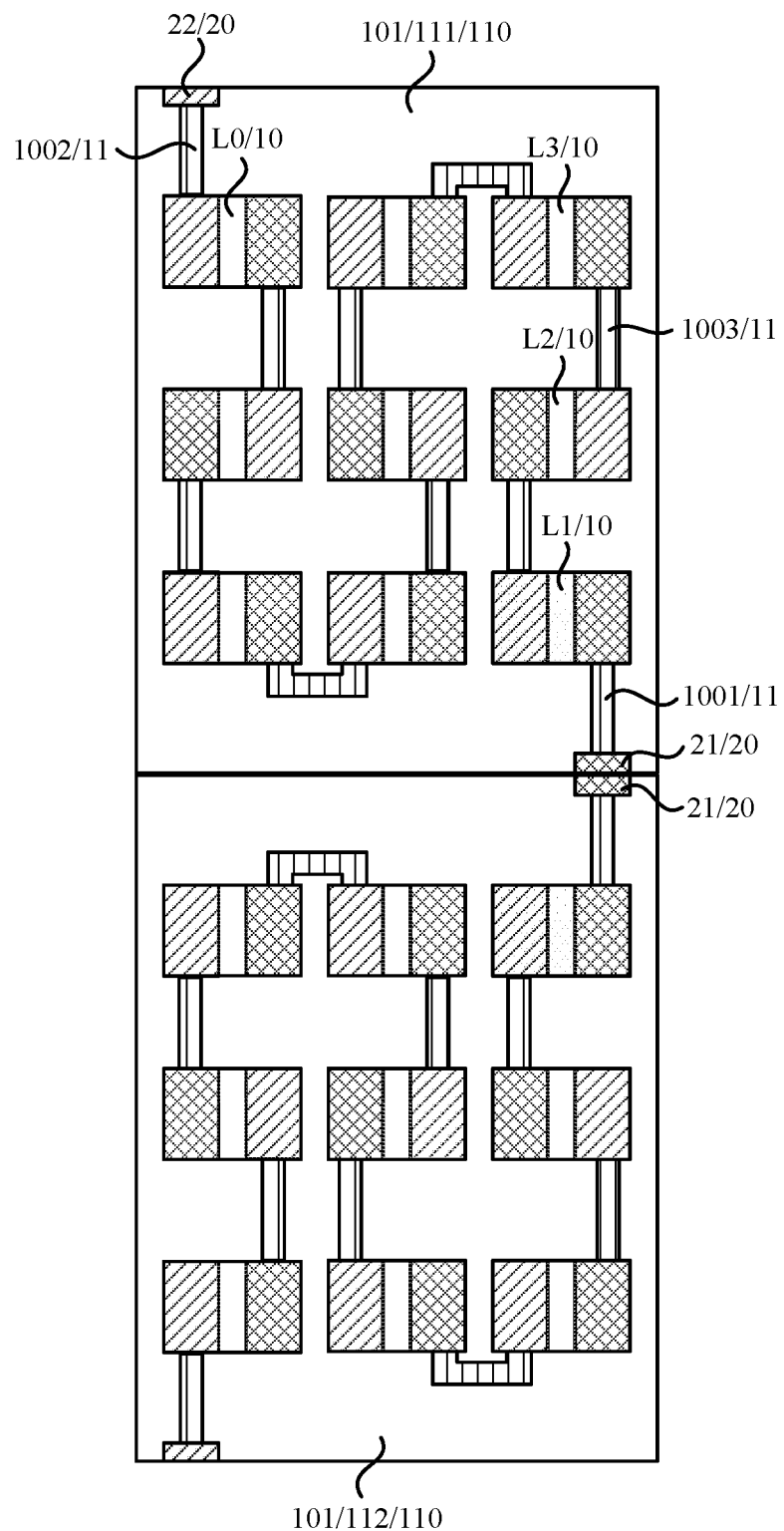
FIG. 25 is a top view illustrating the structure of a splice panel assembly according to embodiments of the present disclosure.
Figure 26:
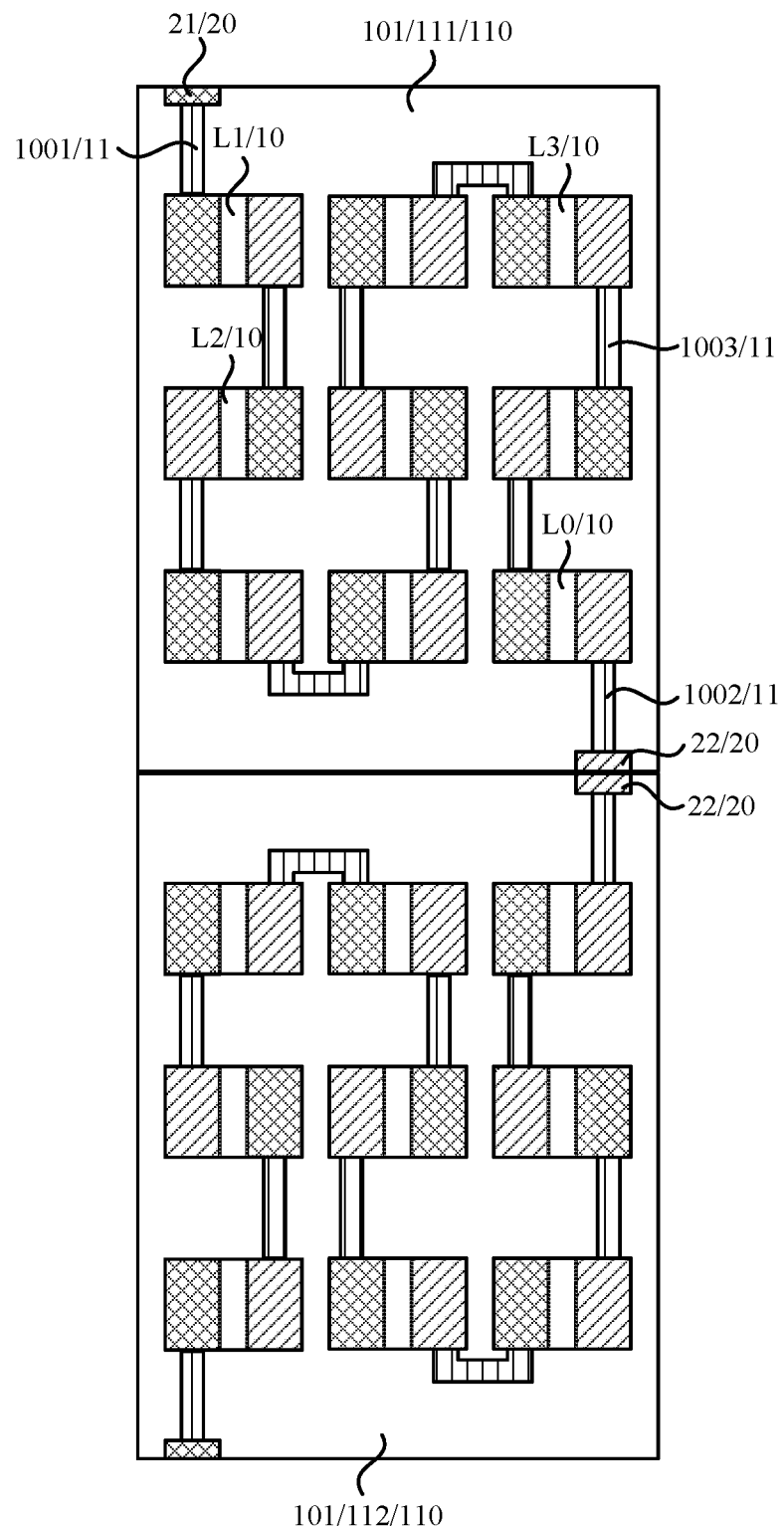
FIG. 26 is a top view illustrating the structure of another splice panel assembly according to embodiments of the present disclosure.
Figure 27:
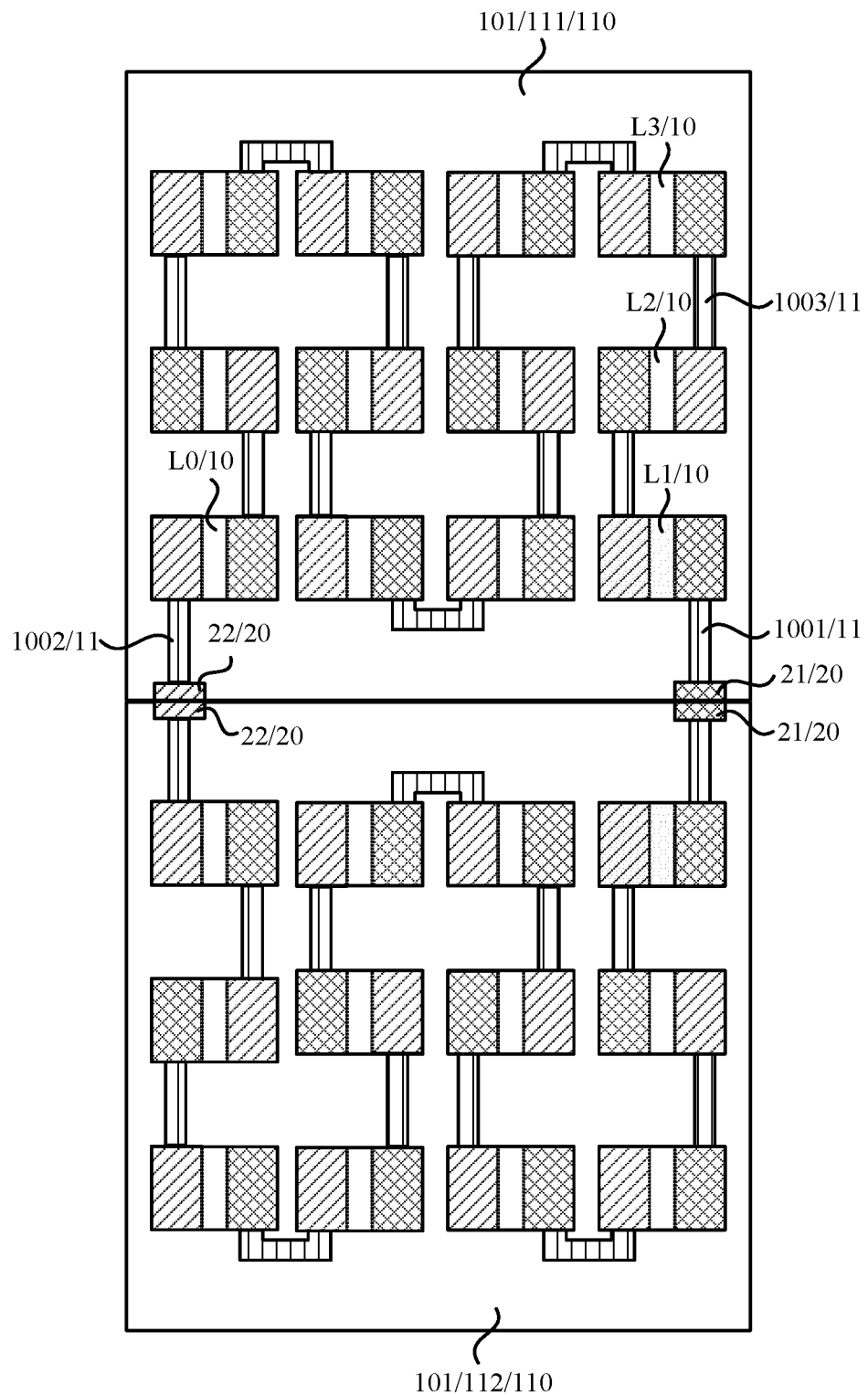
FIG. 27 is a top view illustrating the structure of another splice panel assembly according to embodiments of the present disclosure.
Figure 28:
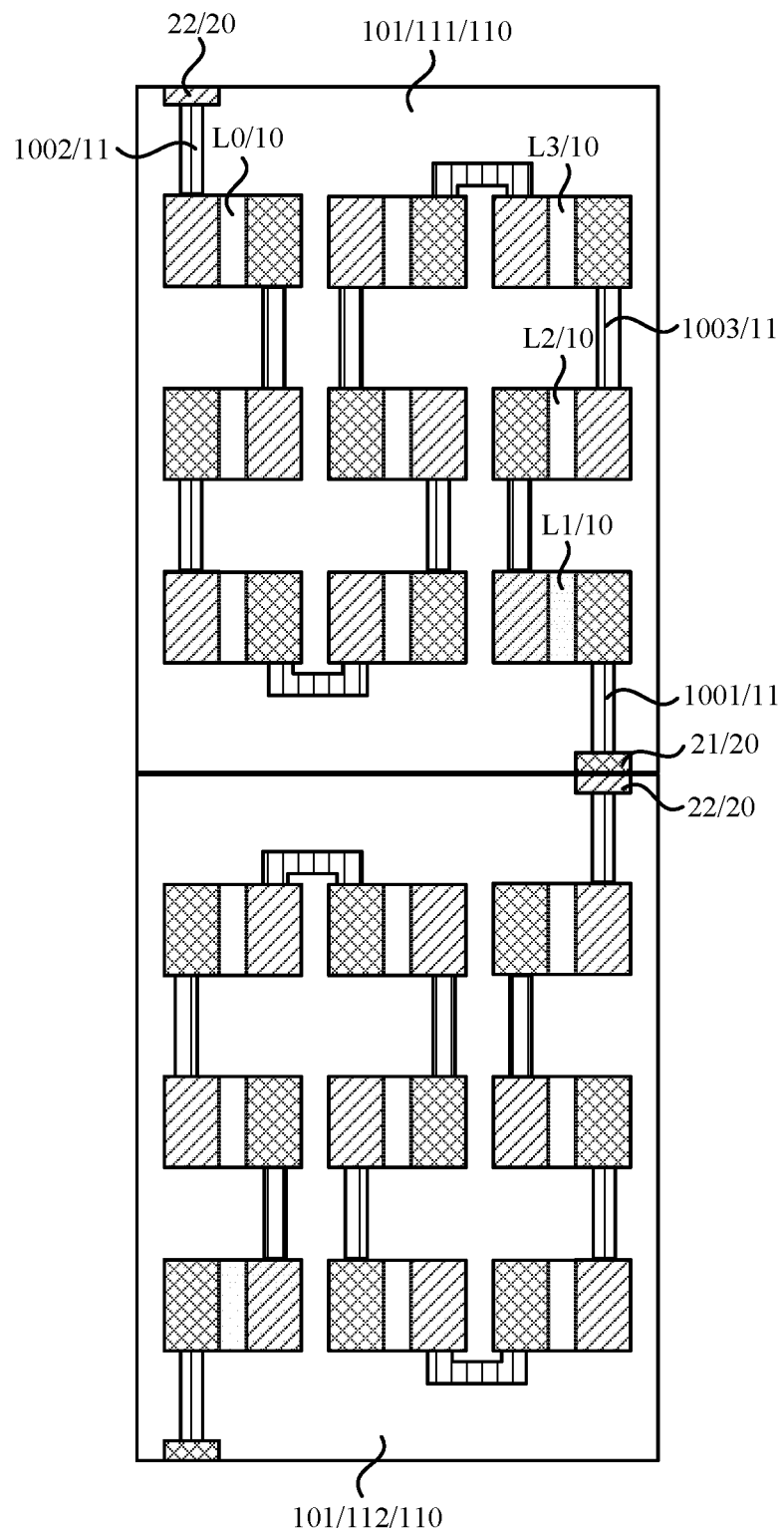
FIG. 28 is a top view illustrating the structure of another splice panel assembly according to embodiments of the present disclosure.

In one embodiment, FIG. 25 is a top view illustrating the structure of a splice panel assembly according to embodiments of the present disclosure, FIG. 26 is a top view illustrating the structure of another splice panel assembly according to embodiments of the present disclosure, FIG. 27 is a top view illustrating the structure of another splice panel assembly according to embodiments of the present disclosure, and FIG. 28 is a top view illustrating the structure of another splice panel assembly according to embodiments of the present disclosure. With reference to any one of FIG. 25, FIG. 26, FIG. 27 or FIG. 28, the signal lines 11 include a first signal line 1001, a second signal line 1002, and a third signal line 1003. Moreover, the connection electrodes 20 include a first connection electrode 21 and a second connection electrode 22. The light-emitting elements 10 of the same light-emitting panel 110 are sequentially connected in series by the third signal lines 1003. Of two adjacent light-emitting elements 10, the second pole of one light-emitting element L2 is electrically connected to the first pole of another light-emitting element L3 by the third signal line 1003. The first pole of the light-emitting element L1 located at the first connection position is electrically connected to the first connection electrode 21 by a first signal line 1001, and the second pole of the light-emitting element LO located at the last connection position is electrically connected to the second connection electrode 22 by a second signal line 1002. The connection mode of two adjacent light-emitting panels 110 includes at least one of a first connection mode, a second connection mode, or a third connection mode. The first connection mode is that first connection electrodes 21 of two adjacent light-emitting panels 110 are electrically connected to each other. The second connection mode is that second connection electrodes 22 of two adjacent light-emitting panels 110 are electrically connected to each other. The third connection mode is that the second connection electrode 22 of one of the two adjacent light-emitting panels 110 is electrically connected to the first connection electrode 21 of the other one of the two adjacent light-emitting panels 110.

In this manner, the light-emitting elements 10 in the same light-emitting panel 110 are connected in series. In this case, the current flowing through the light-emitting elements 10 in the same light-emitting panel 110 is the same and the light-emitting brightness of the light-emitting elements 10 tends to be consistent, to facilitate the improvement of the display uniformity of the light-emitting panel 110. In this case, two adjacent light-emitting panels may be connected in series or in parallel.

Exemplarily, as shown in FIG. 25, in the same light-emitting panel 110, the first connection electrode 21 and the second connection electrode 22 are respectively located on different side faces of the base substrate 101. In this case, two adjacent light-emitting panels may be electrically connected to each other by the first connection electrodes 21. For example, the first connection electrode 21 of the light-emitting panel 111 is electrically connected to the first connection electrode 21 of the light-emitting panel 112 to achieve parallel connection of the light-emitting panel 111 and the light-emitting panel 112. In one embodiment, as shown in FIG. 26, in the same light-emitting panel 110, when the first connection electrode 21 and the second connection electrode 22 are respectively located on different side faces of the base substrate 101, the second connection electrode 22 of the light-emitting panel 111 may be electrically connected to the second connection electrode 22 of the light-emitting panel 112 and the light-emitting panel 111 and the light-emitting panel 112 may also be in parallel connection. In one embodiment, as shown in FIG. 27, in the same light-emitting panel 110, when the first connection electrode 21 and the second connection electrode 22 are located on the same side face of the base substrate 101, the first connection electrode 21 of the light-emitting panel 111 is electrically connected to the first connection electrode 21 of the light-emitting panel 112, and the second connection electrode 22 of the light-emitting panel 111 is electrically connected to the second connection electrode 22 of the light-emitting panel 112 and the light-emitting panel 111 and the light-emitting panel 112 may also be in parallel connection. In addition, as shown in FIG. 28, two adjacent light-emitting panels 110 may be connected in series. That is, the first connection electrode 21 of the light-emitting panel 111 is electrically connected to the second connection electrode 22 of the light-emitting panel 112, to achieve the series connection between the light-emitting panel 111 and the light-emitting panel 112.

In the case where two adjacent light-emitting panels 110 are connected in series, the current flowing through light-emitting elements 10 in each light-emitting panel 110 remains the same and the light-emitting brightness of the light-emitting panels 110 tends to be consistent, to improve the display uniformity of the entire splice panel assembly. In the case where two adjacent light-emitting panels 110 are connected in parallel, the voltages of the light-emitting panels 110 are the same and the light-emitting elements 10 between the first connection electrode 21 and the second connection electrode 22 in each light-emitting panel 110 can have a higher display brightness, to facilitate the improvement of the display light-emitting effect of the splice panel assembly.

Figure 29:
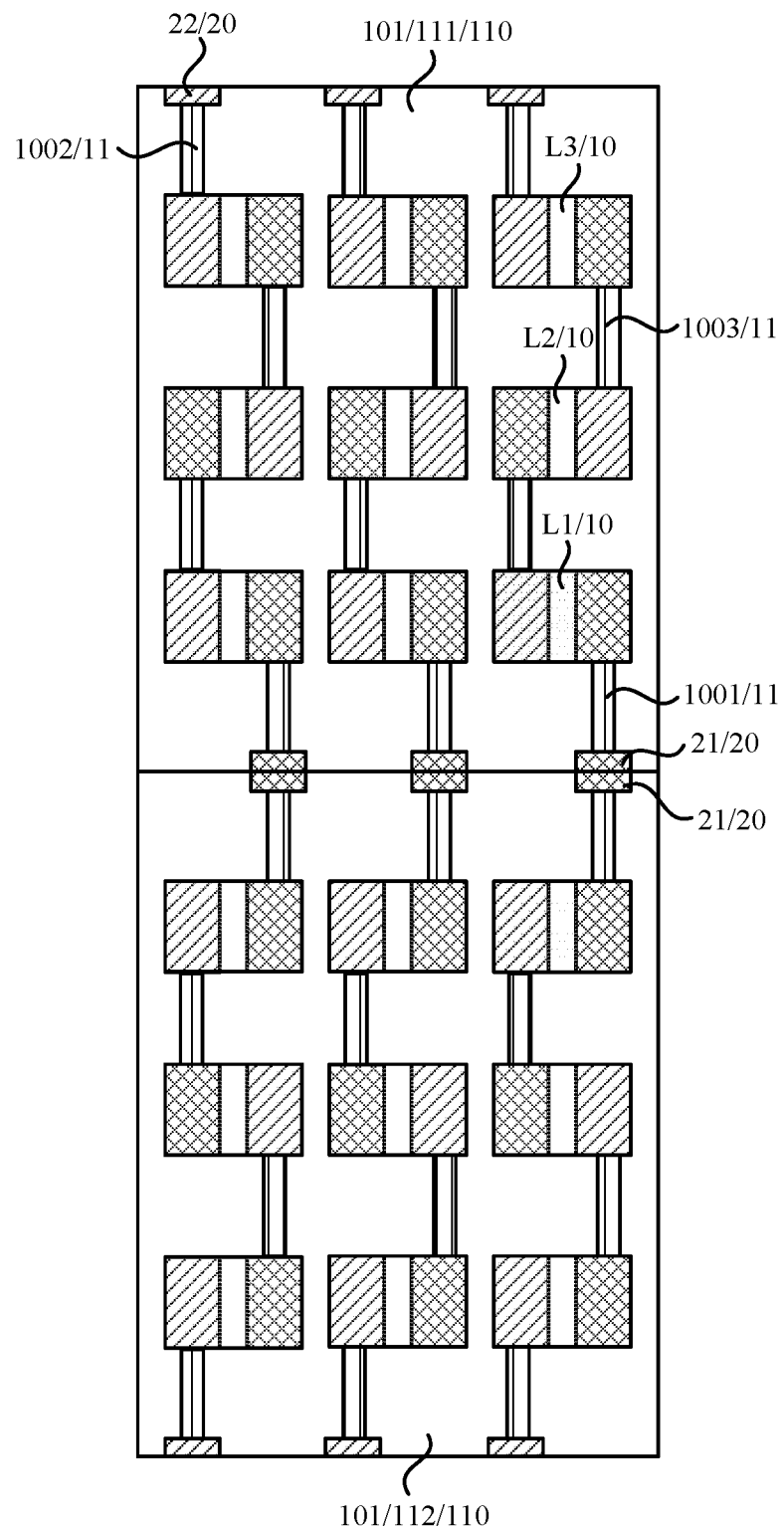
FIG. 29 is a top view illustrating the structure of another splice panel assembly according to embodiments of the present disclosure.
Figure 30:
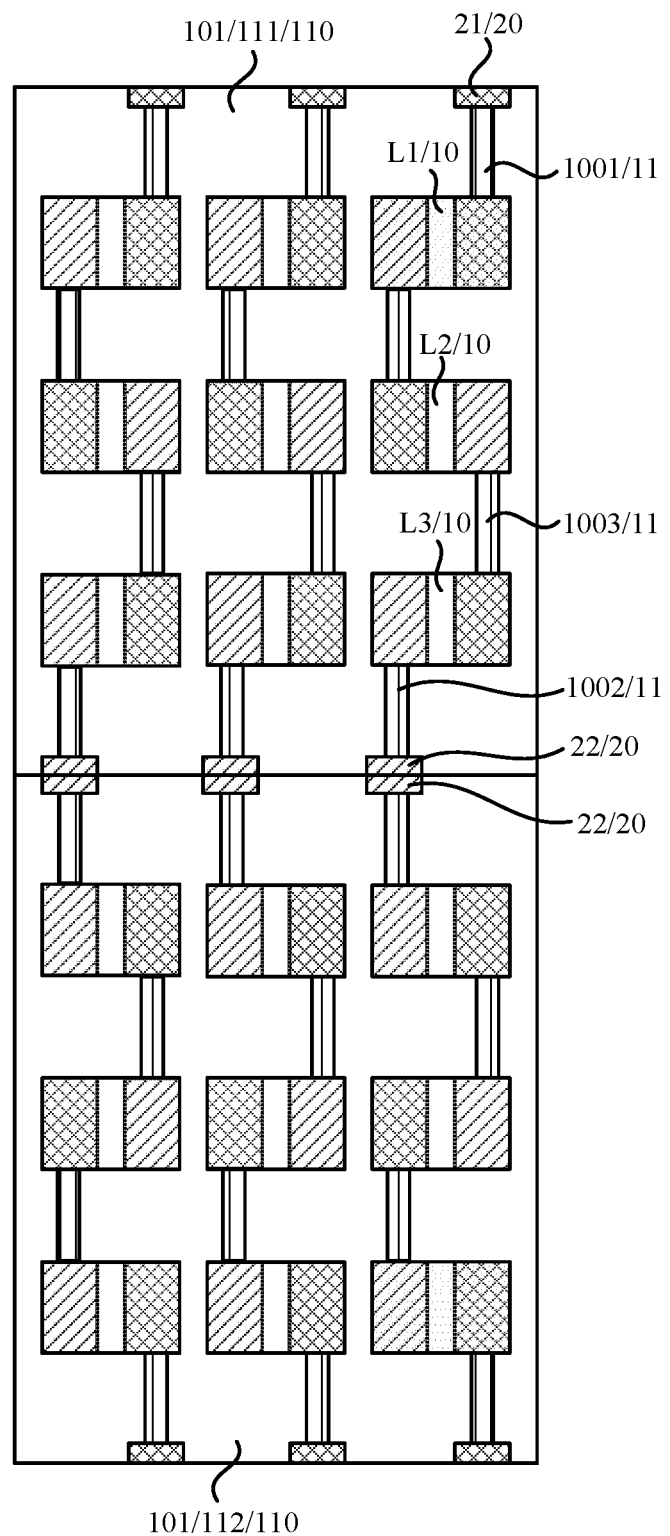
FIG. 30 is a top view illustrating the structure of another splice panel assembly according to embodiments of the present disclosure.
Figure 31:
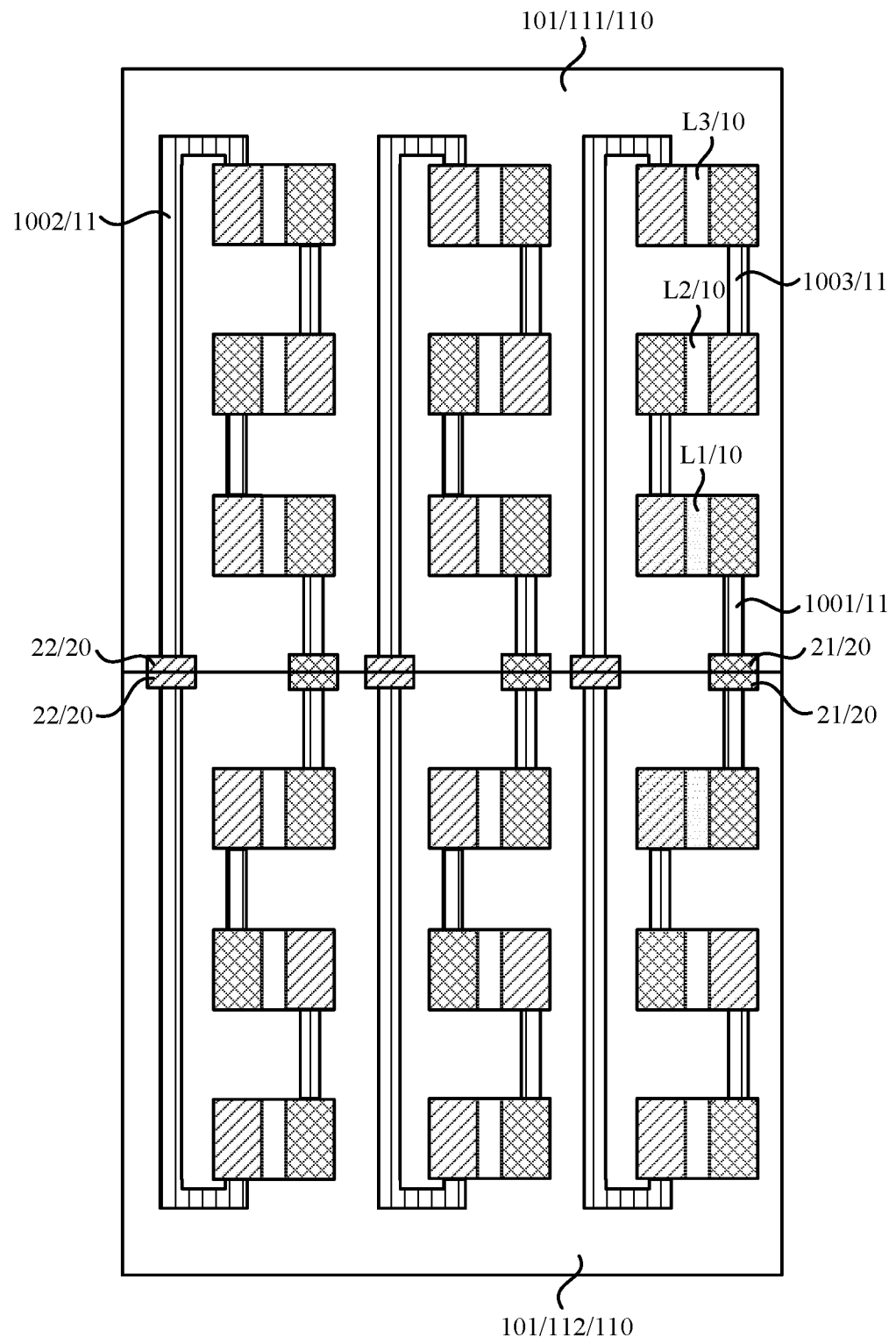
FIG. 31 is a top view illustrating the structure of another splice panel assembly according to embodiments of the present disclosure.
Figure 32:
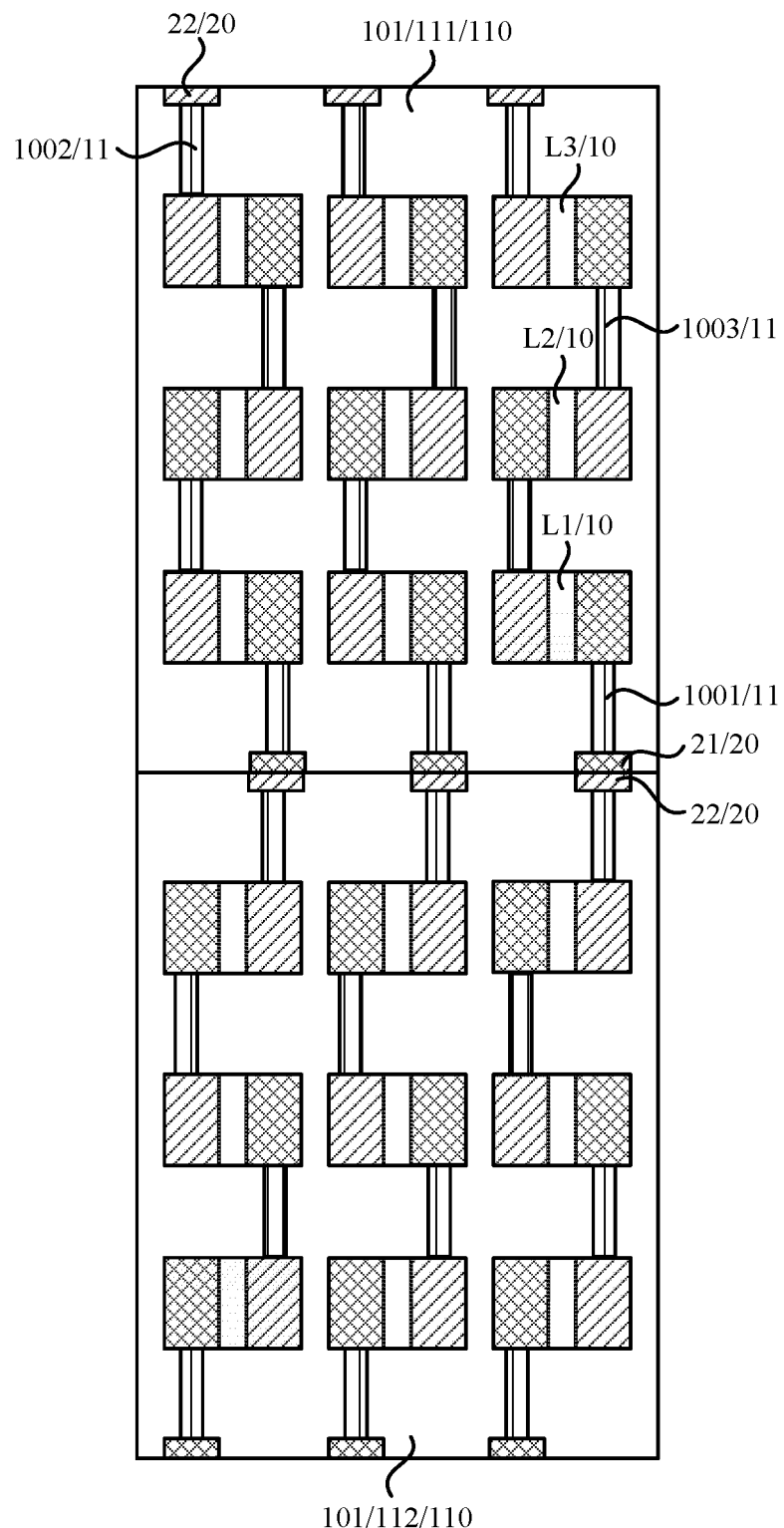
FIG. 32 is a top view illustrating the structure of another splice panel assembly according to embodiments of the present disclosure.

In one embodiment, FIG. 29 is a top view illustrating the structure of another splice panel assembly according to embodiments of the present disclosure, FIG. 30 is a top view illustrating the structure of another splice panel assembly according to embodiments of the present disclosure, FIG. 31 is a top view illustrating the structure of another splice panel assembly according to embodiments of the present disclosure, and FIG. 32 is a top view illustrating the structure of another splice panel assembly according to embodiments of the present disclosure. With reference to any one of FIG. 29, FIG. 30, FIG. 31 or FIG. 32, the signal lines 11 include a plurality of first signal lines 1001, a plurality of second signal lines 1002 and a plurality of third signal lines 1003. In the same light-emitting panel 110, the light-emitting elements 10 located in the same column are connected in series by one third signal line 1003. Of two adjacent light-emitting elements 10 in the same column, the second pole of the light-emitting element L2 is electrically connected to the first pole of the light-emitting element L3 by a third signal line 1003. Moreover, among the light-emitting elements 10 in the same column, the first pole of the light-emitting element L1 located at the first connection position is electrically connected to a first signal line 1001, and the second pole of the light-emitting element L3 located at the last connection position is electrically connected to a second signal line 1002.

In this manner, the light-emitting elements 10 located in the same column is connected in series and the current flowing through the light-emitting elements 10 located in the same column is the same. Moreover, the light-emitting elements 10 located in different columns are connected in parallel and the amount of load on different third signal lines 1003 is relatively small. Thus, on the premise of ensuring the display light-emitting uniformity of the light-emitting elements 10, the display light-emitting brightness of the light-emitting elements 10 can be improved. In the same light-emitting panel 110, when the light-emitting elements 10 in the same column are connected in series, and the light-emitting elements 10 in different columns are connected in parallel, two adjacent light-emitting panels 110 may also be connected in parallel or in series.

In one embodiment, with reference to any one of FIG. 29, FIG. 30, FIG. 31 or FIG. 32, the connection electrodes 20 include a plurality of first connection electrodes 21 electrically connected to the plurality of first signal lines 1001 in a one-to-one manner and a plurality of second connection electrodes 22 electrically connected to the plurality of second signal lines 1002 in a one-to-one manner. The connection mode of two adjacent light-emitting panels 110 includes at least one of a first connection mode, a second connection mode, or a third connection mode. The first connection mode is that the first connection electrodes 21 of two adjacent light-emitting panels 110 are electrically connected in a one-to-one manner. The second connection mode is that the second connection electrodes 22 of two adjacent light-emitting panels 110 are electrically connected in a one-to-one manner. The third connection mode is that the second connection electrodes 22 of one of the two adjacent light-emitting panels 110 are electrically connected to the first connection electrodes 21 of the other one of the two adjacent light-emitting panels 110 in a one-to-one manner.

Exemplarily, as shown in FIG. 29, in the same light-emitting panel 110, the first connection electrodes 21 and the second connection electrodes 22 are respectively located on different side faces of the base substrate 101. In this case, two adjacent light-emitting panels 110 may be electrically connected to each other by the first connection electrodes 21. For example, the first connection electrodes 21 of the light-emitting panel 111 are electrically connected to the first connection electrodes 21 of the light-emitting panel 112 in a one-to-one manner. In this manner, on the premise that the light-emitting elements located in different columns in the same light-emitting panel 110 are connected in parallel, the adjacent light-emitting panels 111 and 112 are also connected in parallel. In one embodiment, as shown in FIG. 30, in the same light-emitting panel 110, when the first connection electrodes 21 and the second connection electrodes 22 are respectively located on different side faces of the base substrate 101, the second connection electrodes 22 of the light-emitting panel 111 may be electrically connected to the second connection electrodes 22 of the light-emitting panel 112 in a one-to-one manner and the light-emitting panel 111 and the light-emitting panel 112 may also be in parallel connection. In one embodiment, as shown in FIG. 31, in the same light-emitting panel 110, when the first connection electrodes 21 and the second connection electrodes 22 are located on the same side face of the base substrate 101, the first connection electrodes 21 of the light-emitting panel 111 are electrically connected to the first connection electrodes 21 of the light-emitting panel 112 in a one-to-one manner, and the second connection electrodes 22 of the light-emitting panel 111 are electrically connected to the second connection electrodes 22 of the light-emitting panel 112 in a one-to-one manner and the light-emitting panel 111 and the light-emitting panel 112 may also be in parallel connection. In addition, as shown in FIG. 32, two adjacent light-emitting panels 110 may be connected in series. That is, the first connection electrodes 21 of the light-emitting panel 111 are electrically connected to the second connection electrodes 22 of the light-emitting panel 112 in a one-to-one manner to achieve the series connection between the light-emitting panel 111 and the light-emitting panel 112.

In the case where two adjacent light-emitting panels 110 are connected in series, the display light-emitting brightness of the light-emitting elements 10 in each light-emitting panel 110 connected in series remains the same and the light-emitting brightness of the light-emitting panels 110 tends to be consistent, to improve the display uniformity of the entire splice panel assembly. In the case where two adjacent light-emitting panels 110 are connected in parallel, the light-emitting panels 110 can have higher display brightness, to facilitate the improvement of the display light-emitting effect of the splice panel assembly.

Figure 33:
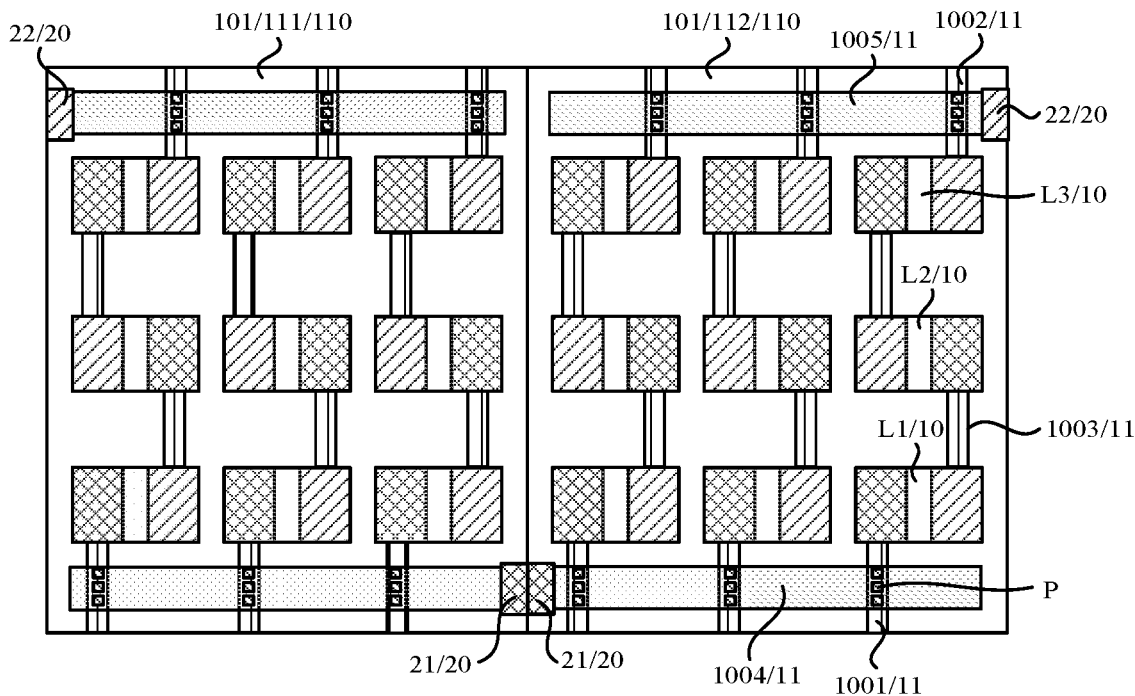
FIG. 33 is a top view illustrating the structure of another splice panel assembly according to embodiments of the present disclosure.
Figure 34:
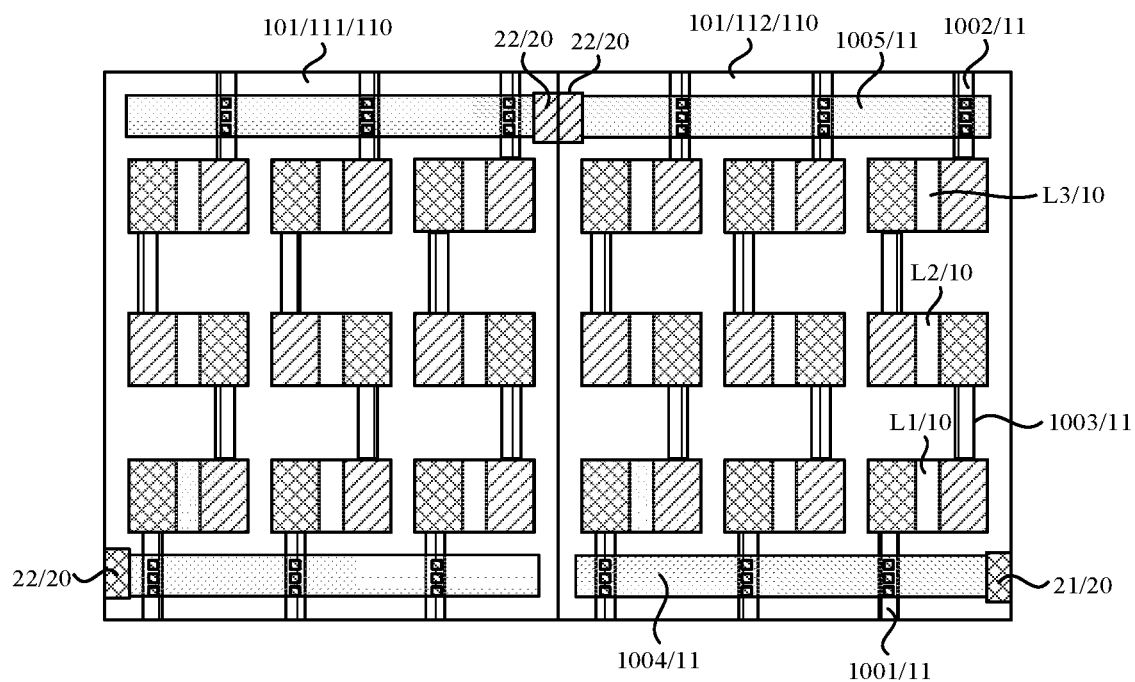
FIG. 34 is a top view illustrating the structure of another splice panel assembly according to embodiments of the present disclosure.
Figure 35:
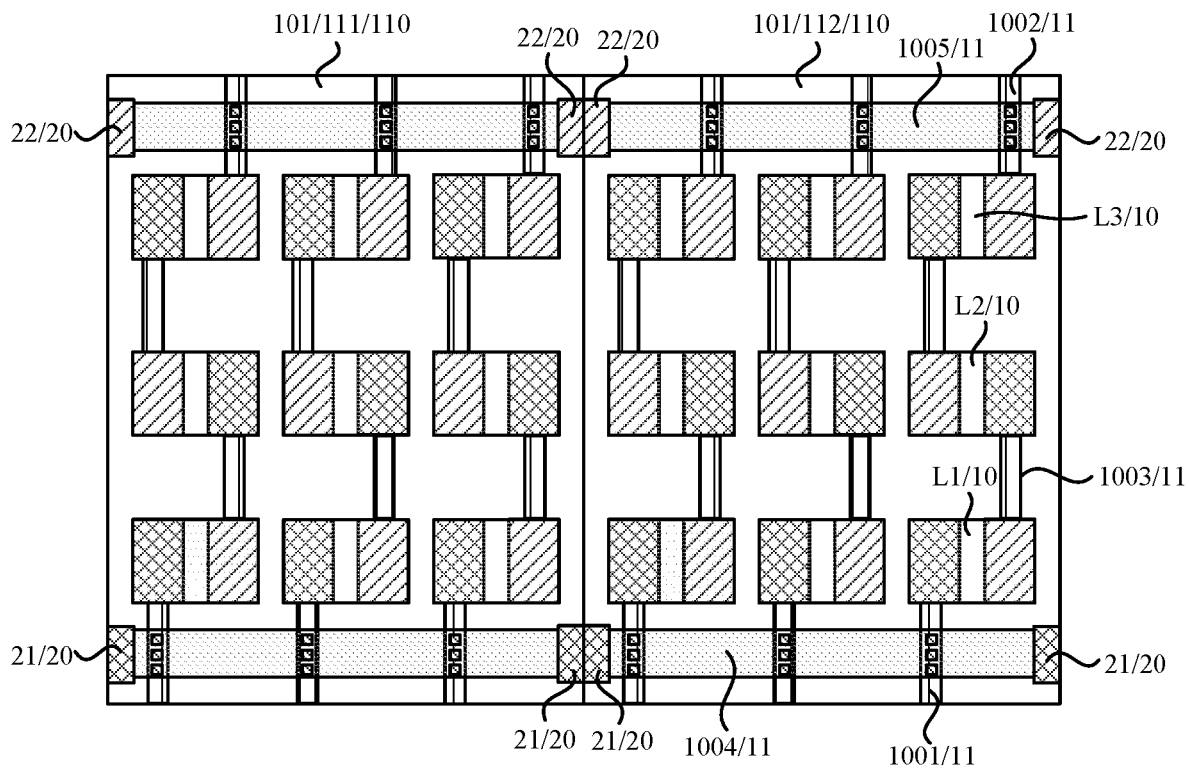
FIG. 35 is a top view illustrating the structure of another splice panel assembly according to embodiments of the present disclosure.
Figure 36:
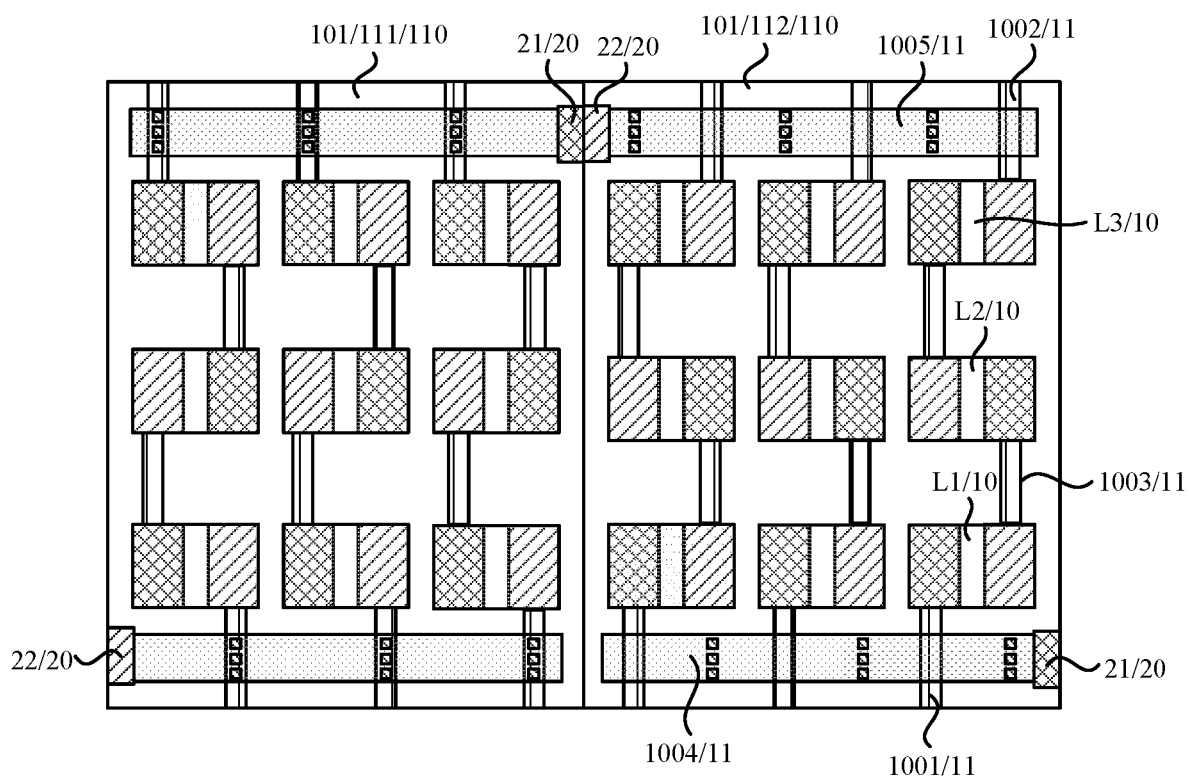
FIG. 36 is a top view illustrating the structure of another splice panel assembly according to embodiments of the present disclosure.

In one embodiment, FIG. 33 is a top view illustrating the structure of another splice panel assembly according to embodiments of the present disclosure, FIG. 34 is a top view illustrating the structure of another splice panel assembly according to embodiments of the present disclosure, FIG. 35 is a top view illustrating the structure of another splice panel assembly according to embodiments of the present disclosure, and FIG. 36 is a top view illustrating the structure of another splice panel assembly according to embodiments of the present disclosure. With reference to any one of FIG. 33, FIG. 34, FIG. 35 or FIG. 36, the connection electrodes 20 include a first connection electrode 21 and a second connection electrode 22; and the signal lines 11 further include a first connection line 1004 and a second connection line 1005. Each first signal line 1001 is electrically connected to the first connection line 1004, and the first connection line 1004 is electrically connected to the first connection electrode 21. Each second signal line 1002 is electrically connected to the second connection line 1005. The second connection line 1005 is electrically connected to the second connection electrode 22. The connection mode of two adjacent light-emitting panels 110 includes at least one of a first connection mode, a second connection mode or a third connection mode. The first connection mode is that first connection electrodes 21 of two adjacent light-emitting panels 110 are electrically connected correspondingly. The second connection mode is that second connection electrodes 22 of two adjacent light-emitting panels 110 are electrically connected correspondingly. The third connection mode is that the second connection electrode 22 of one of the two adjacent light-emitting panels 110 is electrically connected to the first connection electrode 21 of the other one of the two adjacent light-emitting panels 110 in a one-to-one manner.

In this manner, the first signal lines 1001 are connected by the first connection line 1004 and then are electrically connected to the first connection electrode 21, and the second signal lines 1002 are connected by the second connection line 1005 and then are electrically connected to the second connection electrode 22. Therefore, the number of the first connection electrodes 21 and the second connection electrodes 22 in the light-emitting panel 110 can be reduced, to facilitate the simplification of the structure of the light-emitting panel 110 and the technique process of the light-emitting panel 110, and further reducing the cost of the light-emitting panel 110. Two adjacent light-emitting panels 110 may be connected in series or in parallel.

In the embodiments of the present disclosure, the first signal lines 1001 and the first connection line 1004 may be located in the same film layer or different film layers. When the first signal lines 1001 and the first connection line 1004 are located in the same film layer, the first signal lines 1001 and the first connection line 1004 are integrated into one structure. Moreover, when the first signal lines 1001 and the first connection line 1004 are located in different film layers, the first signal lines 1001 and the first connection line 1004 may be electrically connected to each other by a corresponding connection via P. Similarly, the second signal lines 1002 and the second connection line 1005 may be located in the same film layer or different film layers. When the second signal lines 1002 and the second connection line 1005 are located in the same film layer, the second signal lines 1002 and the second connection line 1005 are integrated into one structure. Moreover, when the second signal lines 1002 and the second connection line 1005 are located in different film layers, the second signal lines 1002 and the second connection line 1005 may be electrically connected to each other by a corresponding connection via P. The embodiments of the present disclosure do not specifically limit the film layer relationship of the first signal lines 1001, the first connection line 1004, the second signal lines 1002 and the second connection line 1005.

Exemplarily, as shown in FIG. 33, in the same light-emitting panel 110, the first connection electrode 21 and the second connection electrode 22 are respectively located on different side faces of the base substrate 101. In this case, two adjacent light-emitting panels may be electrically connected to each other by the first connection electrodes 21. That is, the first connection electrode 21 of the light-emitting panel 111 is electrically connected to the first connection electrode 21 of the light-emitting panel 112 and the adjacent light-emitting panel 111 and the light-emitting panel 112 are connected in parallel. In one embodiment, as shown in FIG. 34, in the same light-emitting panel 110, when the first connection electrode 21 and the second connection electrode 22 are respectively located on different side faces of the base substrate 101, the second connection electrode 22 of the light-emitting panel 111 may be electrically connected to the second connection electrode 22 of the light-emitting panel 112 and the light-emitting panel 111 and the light-emitting panel 112 may also be in parallel connection. In one embodiment, as shown in FIG. 35, when the first connection electrode 21 and the second connection electrode 22 are simultaneously disposed on the same side face of the base substrate 101 in the light-emitting panel 110, the first connection electrode 21 of the light-emitting panel 111 is electrically connected to the first connection electrode 21 of the light-emitting panel 112, and the second connection electrode 22 of the light-emitting panel 111 is electrically connected to the second connection electrode 22 of the light-emitting panel 112 and the light-emitting panel 111 and the light-emitting panel 112 may also be in parallel connection. In addition, as shown in FIG. 36, two adjacent light-emitting panels 110 may be connected in series. That is, the first connection electrode 21 of the light-emitting panel 111 is electrically connected to the second connection electrode 22 of the light-emitting panel 112 to achieve the series connection between the light-emitting panel 111 and the light-emitting panel 112. Two adjacent light-emitting panels are connected in parallel or in series, each having respective advantages, and the foregoing description will not be repeated herein.

Figure 37:
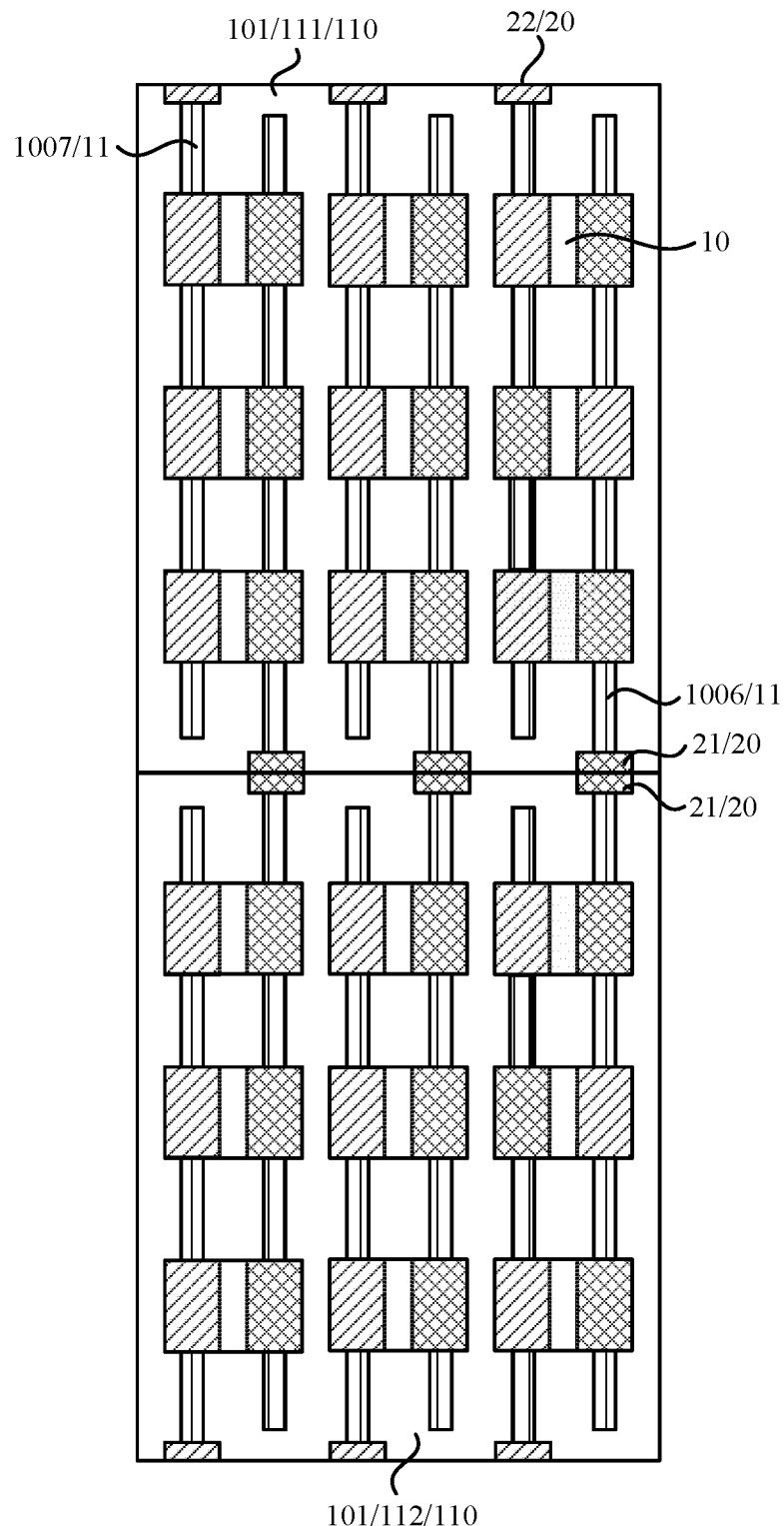
FIG. 37 is a top view illustrating the structure of another splice panel assembly according to embodiments of the present disclosure.
Figure 38:
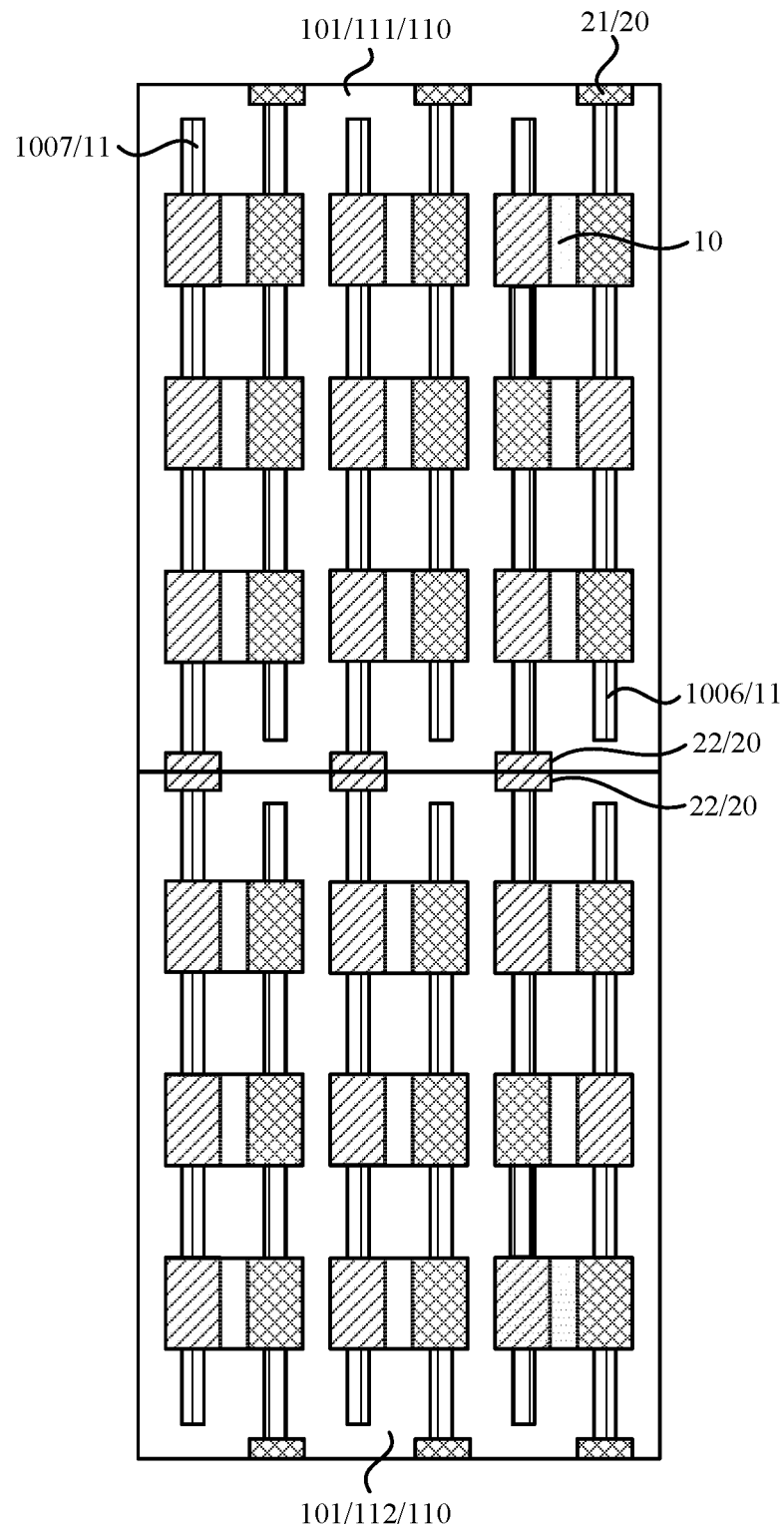
FIG. 38 is a top view illustrating the structure of another splice panel assembly according to embodiments of the present disclosure.
Figure 39:
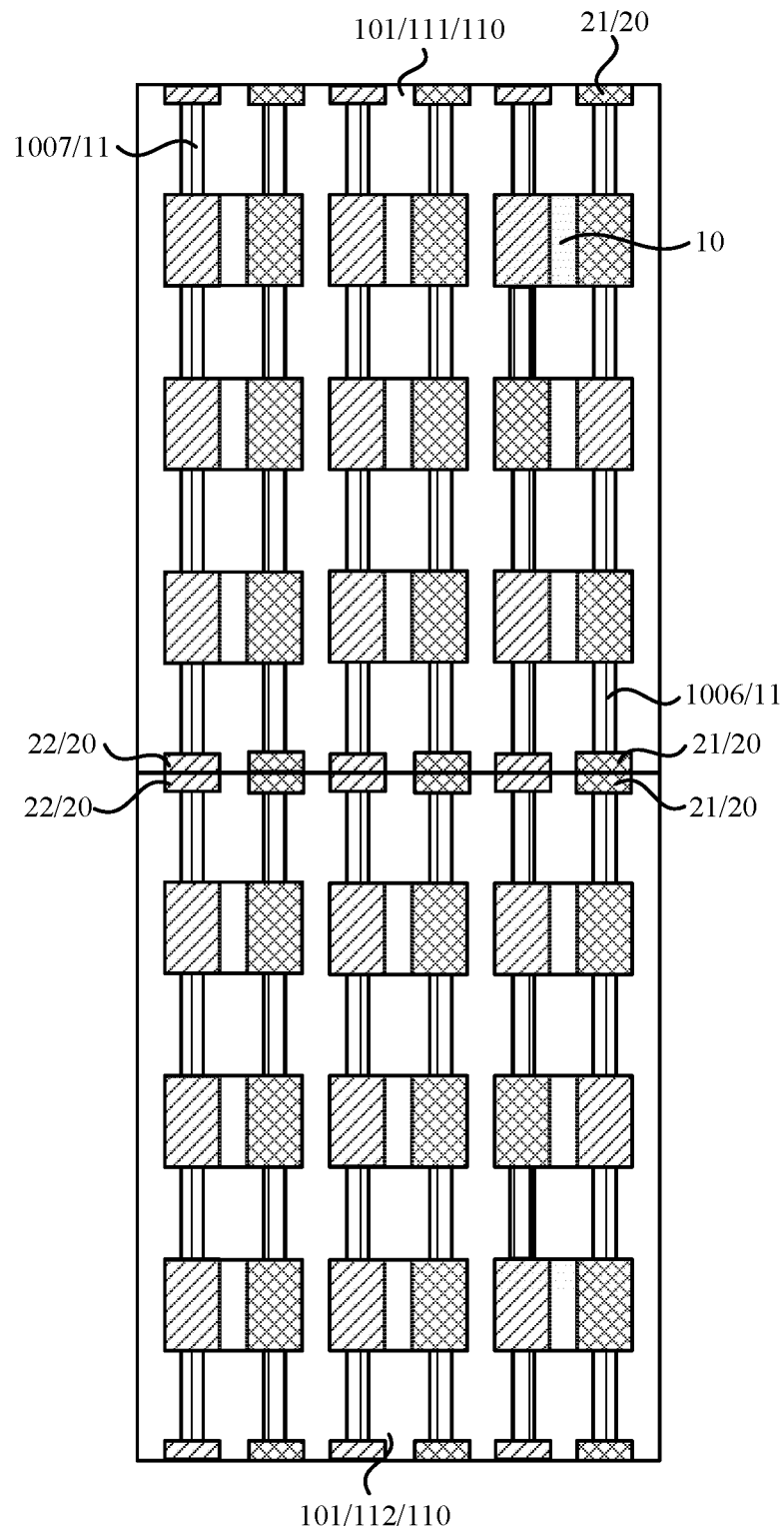
FIG. 39 is a top view illustrating the structure of another splice panel assembly according to embodiments of the present disclosure.
Figure 40:
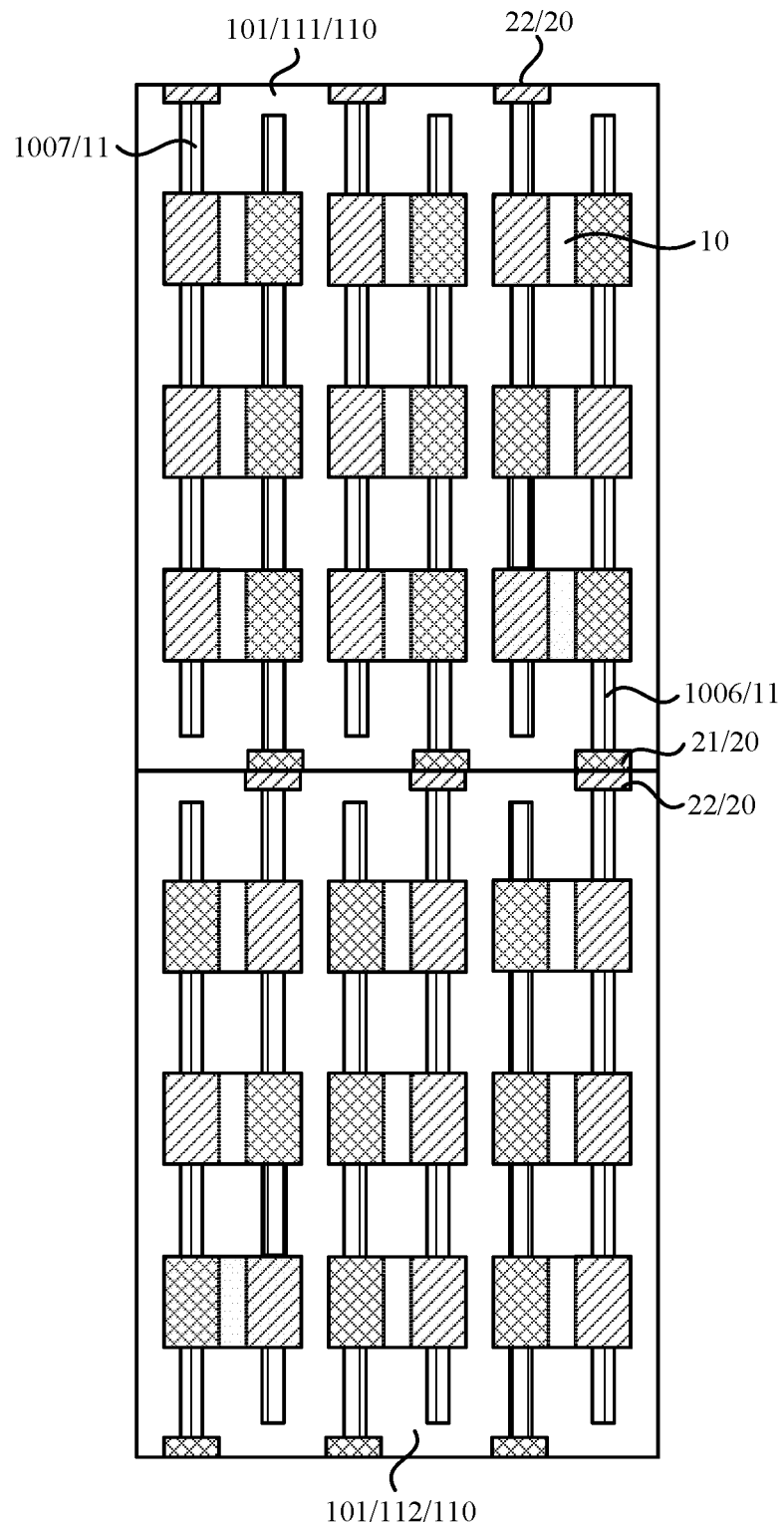
FIG. 40 is a top view illustrating the structure of another splice panel assembly according to embodiments of the present disclosure.

In one embodiment, FIG. 37 is a top view illustrating the structure of another splice panel assembly according to embodiments of the present disclosure, FIG. 38 is a top view illustrating the structure of another splice panel assembly according to embodiments of the present disclosure, FIG. 39 is a top view illustrating the structure of another splice panel assembly according to embodiments of the present disclosure, and FIG. 40 is a top view illustrating the structure of another splice panel assembly according to embodiments of the present disclosure. With reference to any one of FIG. 37, FIG. 38, FIG. 39 or FIG. 40, the signal lines 11 include a plurality of fourth signal lines 1006 and a plurality of fifth signal lines 1007. The first poles of the light-emitting elements 10 in the same column are electrically connected to the same fourth signal line 1006. The second poles of the light-emitting elements 10 located in the same column are electrically connected to the same fifth signal line 1007.

In this manner, in the same light-emitting panel 110, the light-emitting elements 10 are connected in parallel and the voltages applied to the first and second poles of the light-emitting elements 10 are the same, to ensure the display light-emitting uniformity of the light-emitting elements 10 and improving the display light-emitting brightness of the light-emitting elements 10. When the light-emitting elements 10 in the same light-emitting panel 110 are connected in parallel, two adjacent light-emitting panels 110 may be connected in parallel or in series.

In one embodiment, with reference to any one of FIG. 37, FIG. 38, FIG. 39 and FIG. 40, the connection electrodes 20 may include a plurality of first connection electrodes 21 electrically connected to the plurality of fourth signal lines 1006 in a one-to-one manner and a plurality of second connection electrodes 22 electrically connected to the plurality of fifth signal lines 1007 in a one-to-one manner. The connection mode of two adjacent light-emitting panels 110 includes at least one of a first connection mode, a second connection mode or a third connection mode. The first connection mode is that the first connection electrodes 21 of two adjacent light-emitting panels 110 are electrically connected in a one-to-one manner. The second connection mode is that the second connection electrodes 22 of two adjacent light-emitting panels 110 are electrically connected in a one-to-one manner. The third connection mode is that the second connection electrodes 22 of one of the two adjacent light-emitting panels 110 are electrically connected to the first connection electrodes 21 of the other one of the two adjacent light-emitting panels 110 in a one-to-one manner.

Exemplarily, as shown in FIG. 37, in the same light-emitting panel 110, the first connection electrodes 21 and the second connection electrodes 22 are respectively located on different side faces of the base substrate 101. In this case, two adjacent light-emitting panels 110 may be electrically connected to each other through the first connection electrodes 21. For example, the first connection electrodes 21 of the light-emitting panel 111 are electrically connected to the first connection electrodes 21 of the light-emitting panel 112 in a one-to-one manner. In this manner, the adjacent light-emitting panel 111 and the light-emitting panel 112 are connected in parallel. In one embodiment, as shown in FIG. 38, in the same light-emitting panel 110, when the first connection electrodes 21 and the second connection electrodes 22 are respectively located on different side faces of the base substrate 101, the second connection electrodes 22 of the light-emitting panel 111 may be electrically connected to the second connection electrodes 22 of the light-emitting panel 112 in a one-to-one manner and the light-emitting panel 111 and the light-emitting panel 112 may also be in parallel connection. In one embodiment, as shown in FIG. 39, when a plurality of first connection electrodes 21 and a plurality of second connection electrodes 22 are disposed on the same side face of the base substrate 101 in the light-emitting panel 110, the first connection electrodes 21 of the light-emitting panel 111 are electrically connected to the first connection electrodes 21 of the light-emitting panel 112 in a one-to-one manner, and the second connection electrodes 22 of the light-emitting panel 111 are electrically connected to the second connection electrodes 22 of the light-emitting panel 112 in a one-to-one manner and the light-emitting panel 111 and the light-emitting panel 112 may also be in parallel connection. In addition, as shown in FIG. 40, two adjacent light-emitting panels 110 may be connected in series. For example, the first connection electrodes 21 of the light-emitting panel 111 are electrically connected to the second connection electrodes 22 of the light-emitting panel 112 in a one-to-one manner to achieve the series connection between the light-emitting panel 111 and the light-emitting panel 112. Whether two adjacent light-emitting panels are connected in parallel or in series having respective advantages, and the foregoing description will not be repeated herein.

Figure 41:
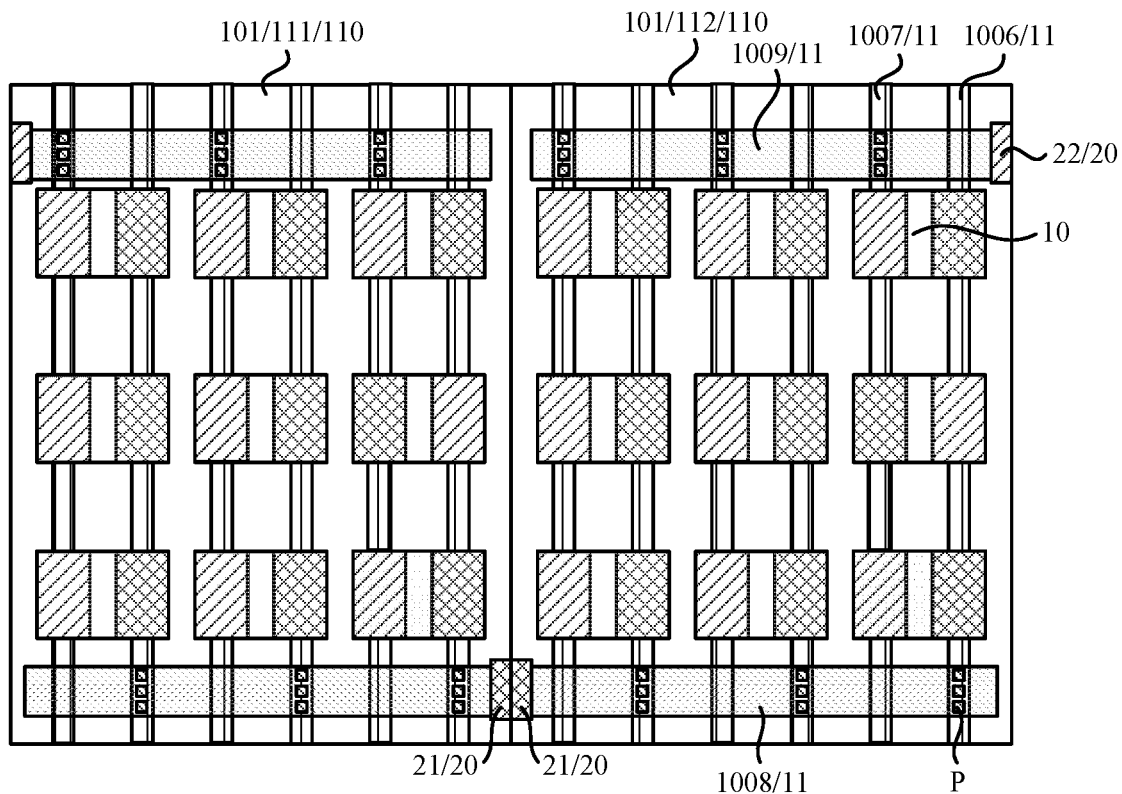
FIG. 41 is a top view illustrating the structure of another splice panel assembly according to embodiments of the present disclosure.
Figure 42:
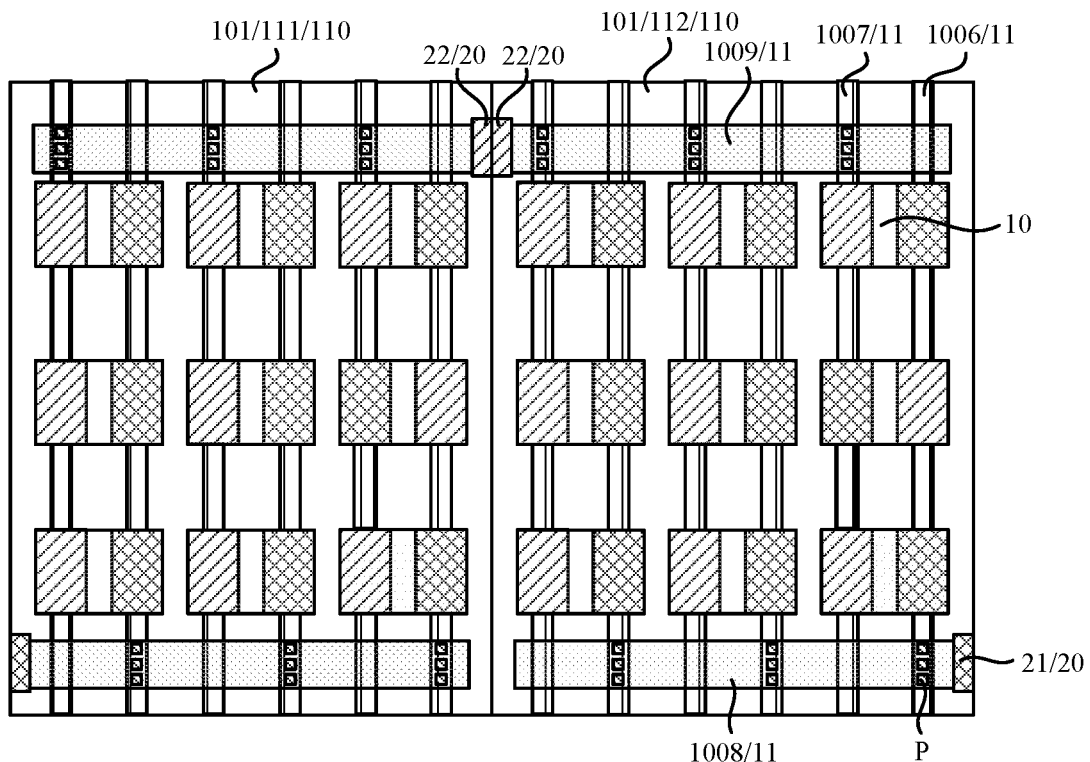
FIG. 42 is a top view illustrating the structure of another splice panel assembly according to embodiments of the present disclosure.
Figure 43:
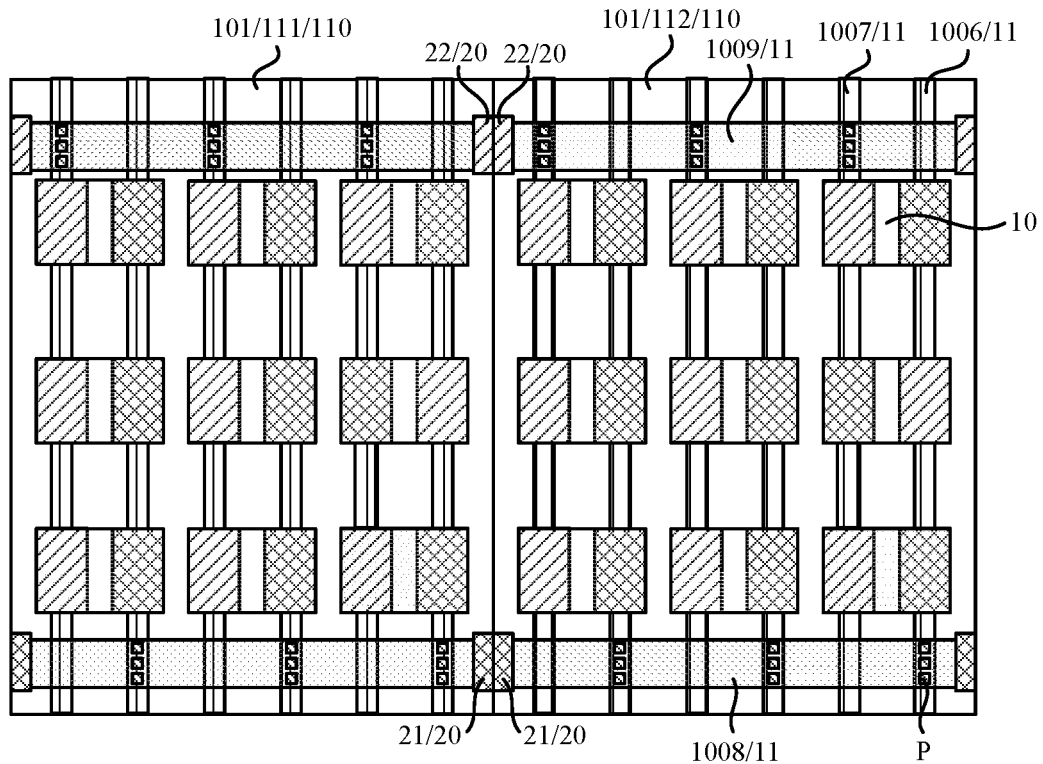
FIG. 43 is a top view illustrating the structure of another splice panel assembly according to embodiments of the present disclosure.
Figure 44:
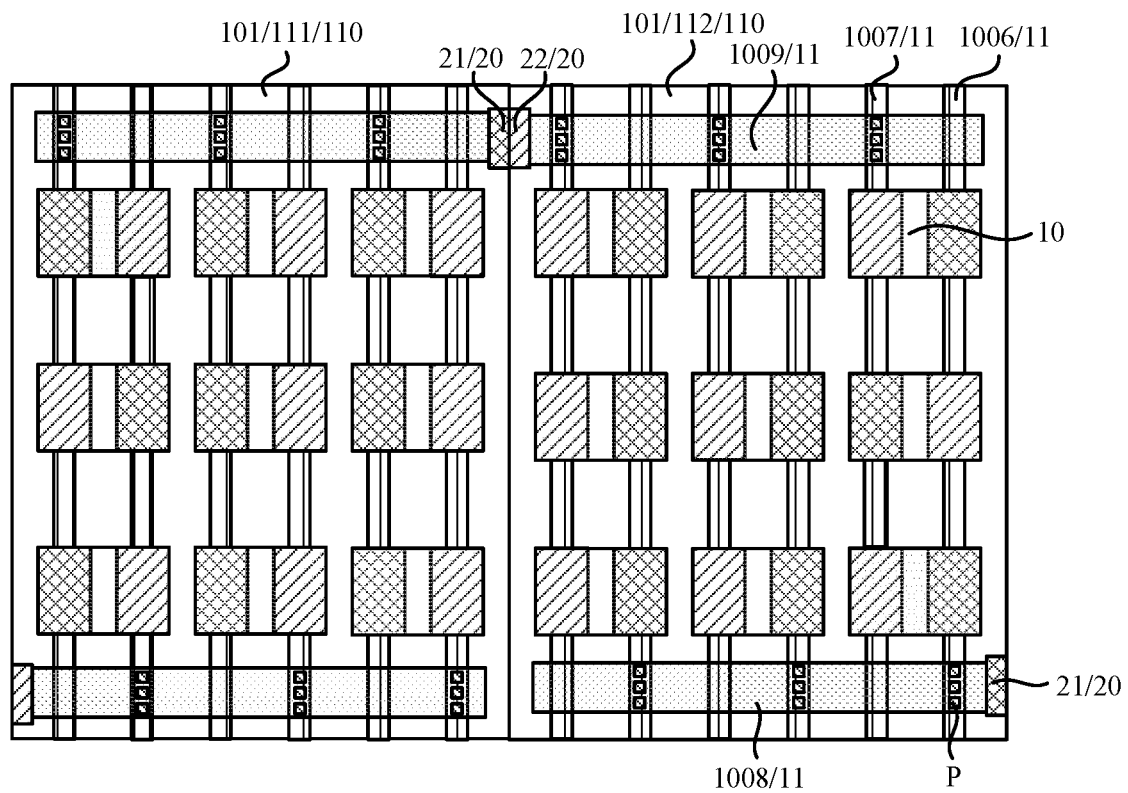
FIG. 44 is a top view illustrating the structure of another splice panel assembly according to embodiments of the present disclosure.

In one embodiment, FIG. 41 is a top view illustrating the structure of another splice panel assembly according to embodiments of the present disclosure, FIG. 42 is a top view illustrating the structure of another splice panel assembly according to embodiments of the present disclosure, FIG. 43 is a top view illustrating the structure of another splice panel assembly according to embodiments of the present disclosure, and FIG. 44 is a top view illustrating the structure of another splice panel assembly according to embodiments of the present disclosure. With reference to any one of FIG. 41, FIG. 42, FIG. 43 or FIG. 44, the connection electrodes 20 include at least one first connection electrode 21 and at least one second connection electrode 22. In this case, the signal lines 11 further include at least one third connection line 1008 and at least one fourth connection line 1009. Each fourth signal line 1006 is electrically connected to the third connection line 1008. The third connection line 1008 is electrically connected to the first connection electrode 21. Each fifth signal line 1007 is electrically connected to the fourth connection line 1009. The fourth connection line 1009 is electrically connected to the second connection electrode 22. The connection mode of two adjacent light-emitting panels 110 includes at least one of a first connection mode, a second connection mode or a third connection mode. The first connection mode is that the first connection electrodes 21 of two adjacent light-emitting panels 110 are electrically connected in a one-to-one manner. The second connection mode is that the second connection electrodes 22 of two adjacent light-emitting panels 110 are electrically connected in a one-to-one manner. The third connection mode is that the second connection electrode 22 of one of the two adjacent light-emitting panels 110 is electrically connected to the first connection electrode 22 of the other one of the two adjacent light-emitting panels 110 in a one-to-one manner.

Exemplarily, the signal lines 11 include one third connection line 1008 and one fourth connection line 1009 as an example. In this case, the connection electrodes 20 include one first connection electrode 21 correspondingly electrically connected to the third connection line 1008 and one second connection electrode 22 correspondingly electrically connected to the fourth connection line 1009. As shown in FIG. 41, in the same light-emitting panel 110, the first connection electrode 21 and the second connection electrode 22 are respectively located on different side faces of the base substrate 101. In this case, two adjacent light-emitting panels 110 may be electrically connected to each other by the first connection electrodes 21. That is, the first connection electrode 21 of the light-emitting panel 111 is electrically connected to the first connection electrode 21 of the light-emitting panel 112 and the adjacent light-emitting panel 111 and the light-emitting panel 112 are connected in parallel. In one embodiment, as shown in FIG. 42, in the same light-emitting panel 110, when the first connection electrode 21 and the second connection electrode 22 are respectively located on different side faces of the base substrate 101, the second connection electrode 22 of the light-emitting panel 111 may be electrically connected to the second connection electrode 22 of the light-emitting panel 112 and the light-emitting panel 111 and the light-emitting panel 112 can also be in parallel connection. In one embodiment, as shown in FIG. 43, when the first connection electrode 21 and the second connection electrode 22 are disposed on the same side face of the base substrate 101 in the light-emitting panel 110, the first connection electrode 21 of the light-emitting panel 111 is electrically connected to the first connection electrode 21 of the light-emitting panel 112, and the second connection electrode 22 of the light-emitting panel 111 is electrically connected to the second connection electrode 22 of the light-emitting panel 112 and the light-emitting panel 111 and the light-emitting panel 112 can also be in parallel connection. In addition, as shown in FIG. 44, two adjacent light-emitting panels 110 may be connected in series. For example, the first connection electrode 21 of the light-emitting panel 111 is electrically connected to the second connection electrode 22 of the light-emitting panel 112. In this manner, the series connection between the light-emitting panel 111 and the light-emitting panel 112 is achieved. Whether two adjacent light-emitting panels are connected in parallel or in series having respective advantages, and the foregoing description will not be repeated herein.

Figure 45:
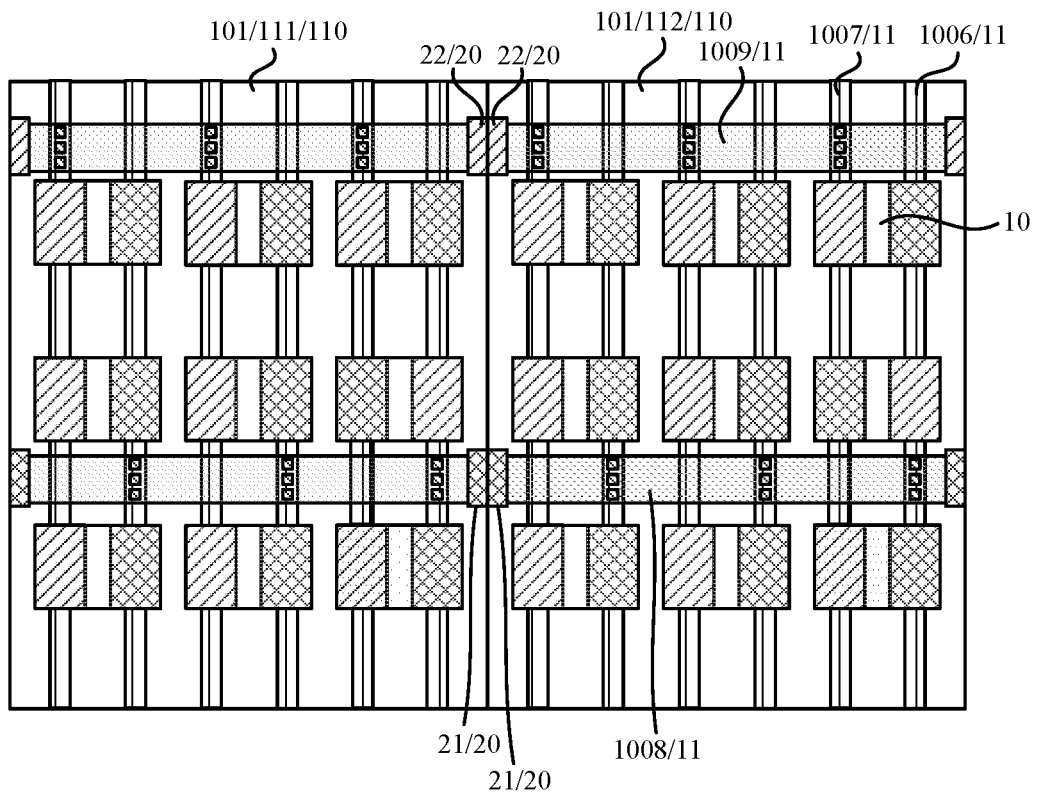
FIG. 45 is a top view illustrating the structure of another splice panel assembly according to embodiments of the present disclosure.
Figure 46:
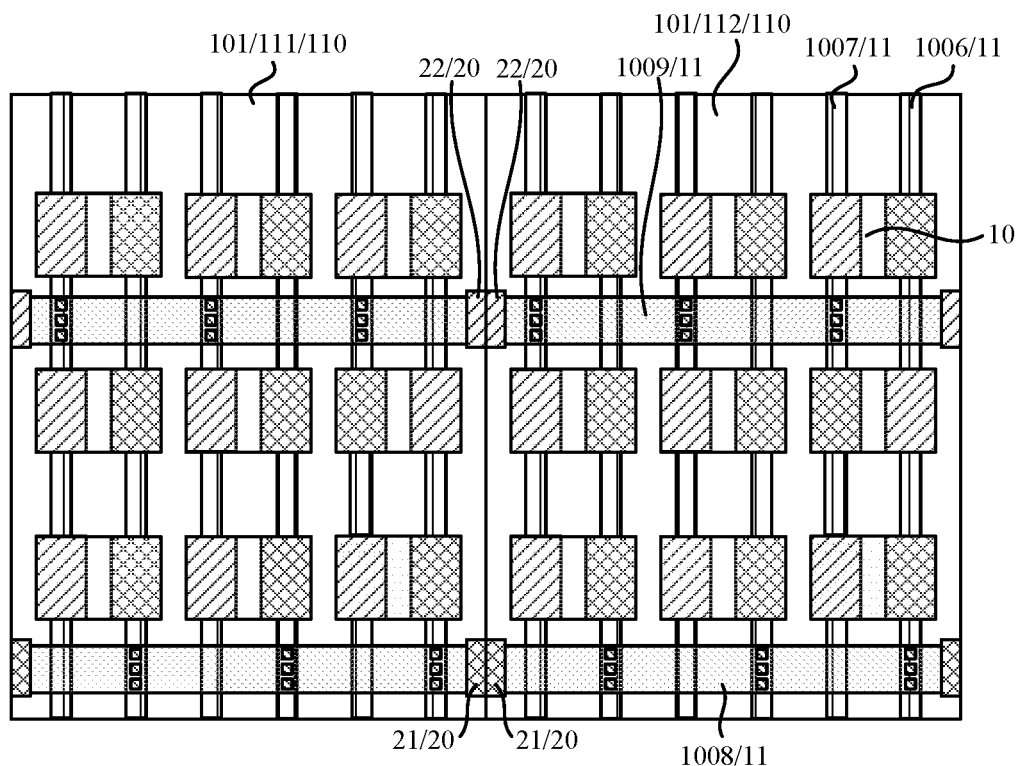
FIG. 46 is a top view illustrating the structure of another splice panel assembly according to embodiments of the present disclosure.
Figure 47:
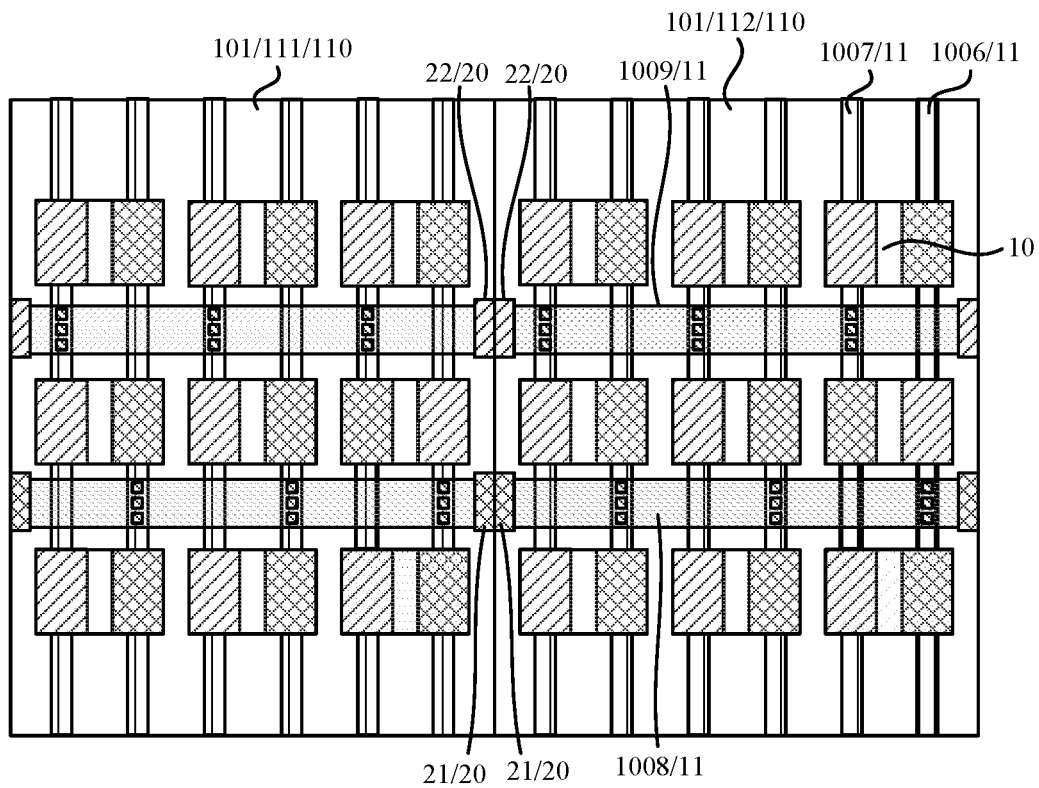
FIG. 47 is a top view illustrating the structure of another splice panel assembly according to embodiments of the present disclosure.

It is to be understood that in FIGS. 41 to 44, the third connection line 1008 and the fourth connection line 1009 are located on opposite sides of the light-emitting elements 10. In the embodiments of the present disclosure, as shown in FIG. 45, the third connection line 1008 is located between two adjacent rows of light-emitting elements 10, and the fourth connection line 1009 is located on a side of the light-emitting elements 10. In one embodiment, as shown in FIG. 46, the fourth connection line 1009 is located between two adjacent rows of the light-emitting elements 10, and the third connection line 1008 is located on a side of the light-emitting elements 10. In one embodiment, as shown in FIG. 47, the third connection line 1008 and the fourth connection line 1009 are both located between two adjacent rows of the light-emitting elements 10.

Figure 48:
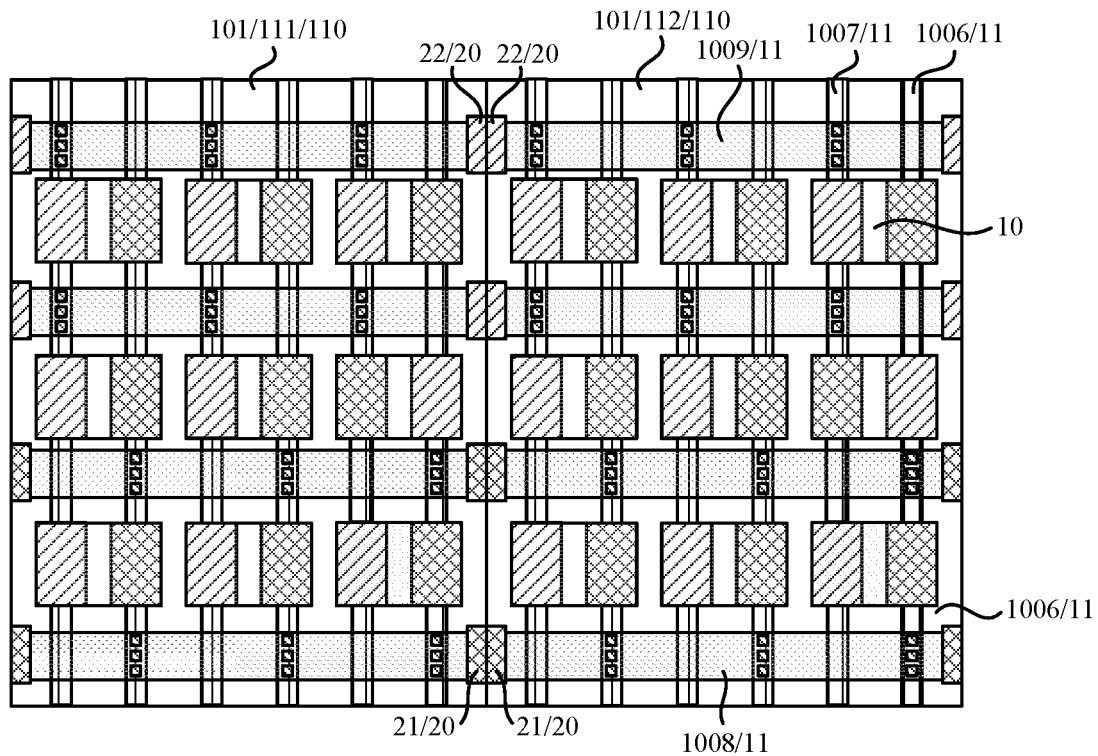
FIG. 48 is a top view illustrating the structure of another splice panel assembly according to embodiments of the present disclosure.

In addition, in the embodiments of the present disclosure, as shown in FIG. 48, the signal lines 11 may further include a plurality of third connection lines 1008 and a plurality of fourth connection lines 1009. In this case, the connection electrodes 20 include a plurality of first connection electrodes 21 correspondingly electrically connected to the plurality of third connection lines 1008 and a plurality of second connection electrodes 22 correspondingly electrically connected to the plurality of fourth connection lines 1009. The plurality of third connection lines 1008 may include at least one third connection line 1008 located on a side of the light-emitting elements 10 and/or at least one third connection line 1008 located between two adjacent rows of the light-emitting elements 10. Moreover, the plurality of fourth connection lines 1009 may include at least one fourth connection line 1009 located on a side of the light-emitting elements 10 and/or at least one fourth connection line 1009 located between two adjacent rows of the light-emitting elements 10. The embodiments of the present disclosure do not specifically limit the specific arrangement of the third connection line 1008 and the fourth connection line 1009.

The fourth signal lines 1006 and the third connection lines 1008 may be located in the same film layer or different film layers. The fifth signal lines 1007 and the fourth connection lines 1009 may be located in the same film layer or different film layers. When the fourth signal lines 1006 and the third connection lines 1008 are located in the same film layer, the fourth signal lines 1006 and the third connection lines 1008 are integrated into one structure. The fifth signal lines 1007 and the fourth connection lines 1009 may be located in the same film layer, and the fifth signal lines 1007 and the fourth connection lines 1009 may be integrated into one structure. In this case, the fourth signal lines 1006 and the fifth signal lines 1007 may be respectively located in different film layers. When the fourth signal lines 1006 and the third connection lines 1008 are located in different film layers, the fourth signal lines 1006 and the third connection lines 1008 may be electrically connected to each other by a corresponding connection via P. Similarly, when the fifth signal lines 1007 and the fourth connection lines 1009 are located in different film layers, the fifth signal lines 1007 and the fourth connection lines 1009 may be electrically connected to each other by a corresponding connection via P. In this case, the fourth signal lines 1006 and the fifth signal lines 1007 may be located in the same film layer, and the third connection lines 1008 and the fourth connection lines 1009 may be located in the same film layer. The embodiments of the present disclosure do not specifically limit the film layer relationship of the fourth signal lines 1006, the fifth signal lines 1007, the third connection lines 1008 and the fourth connection lines 1009.

Figure 49:
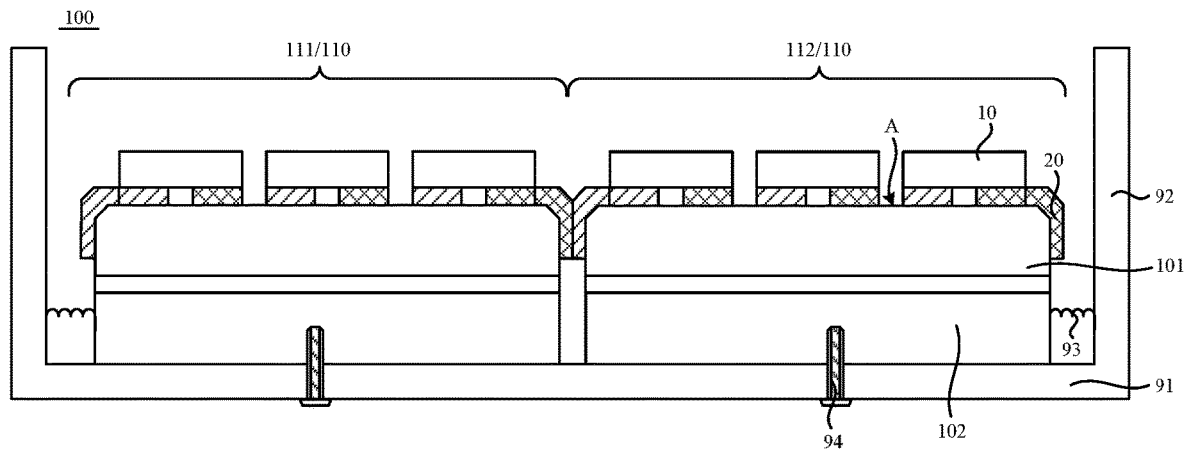
FIG. 49 is a diagram illustrating the structure of another splice panel assembly according to embodiments of the present disclosure.

In one embodiment, FIG. 49 is a diagram illustrating the structure of another splice panel assembly according to embodiments of the present disclosure. As shown in FIG. 49, the splice panel assembly 100 further includes a support structure 90. The support structure 90 at least includes a support base plate 91. The light-emitting panels 110 are secured to the support base plate and the support base plate 91 of the support structure 90 can support and protect the light-emitting panels 110 to ensure higher connection stability of the light-emitting panels 110 after splicing, to improve stability of the splice panel assembly 100.

The secure mode of the light-emitting panels 110 on the support base plate 91 may be directly attached by double-sided adhesive or secured by a fastener 94.

In one embodiment, with continued reference to FIG. 49, each light-emitting panel 110 further includes a support substrate 102. The support substrate 102 is located on the side of the base substrate 101 facing away from the light-emitting elements 10. The support substrate 102 of each light-emitting panel 110 is secured to the support base plate 91 through the fastener 94. In this manner, through the fastener 94, the support substrate 102 of each light-emitting panel 110 is secured to the support base plate 91. Thus, the stability of the splice panel assembly 100 can be further improved. The fastener 94 may be a screw or the like.

In one embodiment, with continued reference to FIG. 49, the support structure 90 further includes support side plates 92. Each support side plate 92 is connected to and not parallel to the support base plate 91. The support base plate 91 and the support side plates 92 form an accommodation space. Each light-emitting panel 110 is accommodated in the accommodation space and the support structure 90 can play a high supporting and protecting role for each light-emitting panel 110 and prevent each light-emitting panel 110 from being impacted by external forces.

In one embodiment, with continued reference to FIG. 49, the side of each support side plate 92 facing the light-emitting panels 110 is provided with at least one resilient structure 93. The at least one resilient structure 93 is in resilient contact with the light-emitting panel 110 closest to the each support side plate 92 to push the light-emitting panel 110 in resilient contact with the at least one resilient structure 93 through the resilient force of the at least one resilient structure 93, to clamp each light-emitting panel 110 accommodated in the support structure 90, to improve the connection stability of each light-emitting panel 110.

Figure 50:
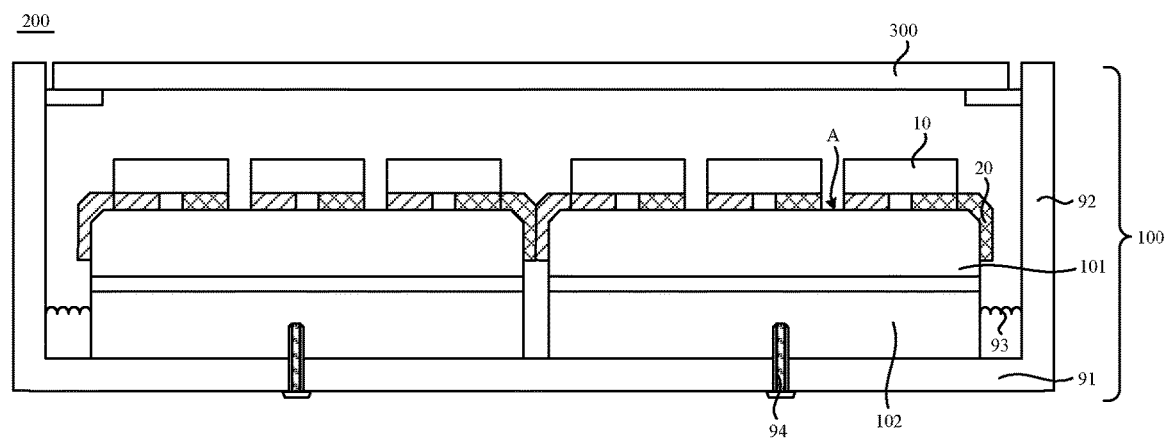
FIG. 50 is a diagram illustrating the structure of a backlight module according to embodiments of the present disclosure.

The embodiments of the present disclosure also provide a backlight module. FIG. 50 is a diagram illustrating the structure of a backlight module according to embodiments of the present disclosure. As shown in FIG. 50, the backlight module 200 includes the splice panel assembly 100 provided by the embodiments of the present disclosure. In addition, the backlight module 200 also includes a light homogenizer assembly 300 to improve the brightness and uniformity of light sources provided by the backlight module 200.

Since the backlight module provided by the embodiments of the present disclosure includes the splice panel assembly provided by the embodiments of the present disclosure, the backlight module has the disclosure of the splice panel assembly provided by the embodiments of the present disclosure and can achieve the beneficial effects of the splice panel assembly provided by the embodiments of the present disclosure. For the same, refer to the description of the splice panel assembly provided by the embodiments of the present disclosure, and details are not described herein.

Figure 51:
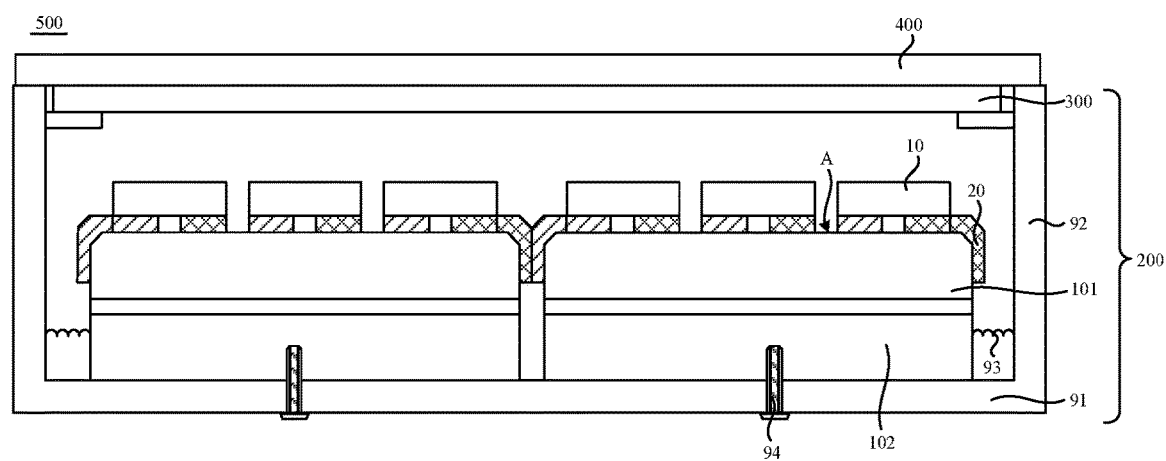
FIG. 51 is a diagram illustrating the structure of a display device according to embodiments of the present disclosure.

The embodiments of the present disclosure also provide a display device. FIG. 51 is a diagram illustrating the structure of a display device according to embodiments of the present disclosure. As shown in FIG. 51, the display device 500 includes a display panel 400 and the backlight module 200 provided by the embodiments of the present disclosure. Exemplarily, the display device 500 provided by the embodiments of the present disclosure includes, but is not limited to, a notebook computer, a billboard, a display of other non-portable devices and the like.

Since the display device provided by the embodiments of the present disclosure includes the backlight module provided by any embodiment of the present disclosure, the display device provided by the embodiments of the present disclosure includes corresponding functional modules of the backlight module and can achieve the beneficial effects of the backlight module provided by the embodiments of the present disclosure. For details not described in detail in the preceding embodiments, refer to the preceding description of the backlight module provided by the embodiments of the present disclosure.

It is to be noted that the preceding are only some embodiments of the present disclosure. The present disclosure is not limited to the embodiments described herein. Various apparent modifications, adaptations and substitutions without departing from the scope of the present disclosure. Therefore, while the present disclosure has been described in detail via the preceding embodiments, the present disclosure is not limited to the preceding embodiments and may include more equivalent embodiments without departing from the disclosure of the present disclosure. The scope of the present disclosure is determined by the scope of the appended claims.

What is claimed is:

1. A splice panel assembly, comprising:
a plurality of light-emitting panels, wherein
each of the plurality of light-emitting panels comprises a base substrate; a front face of the base substrate is provided with a plurality of light-emitting elements arranged in an array; a side face of the base substrate is provided with at least one connection electrode; and the plurality of light-emitting elements are electrically connected to the at least one connection electrode, wherein the front face of the base substrate is connected to the side face of the base substrate and not parallel to the side face of the base substrate; and
two adjacent light-emitting panels of the plurality of light-emitting panels are electrically connected to each other by the at least one connection electrode;
wherein the side face of the base substrate is further provided with at least one conductive protection structure corresponding to the at least one connection electrode in a one-to-one manner; a conductive protection structure of the at least one conductive protection structure is electrically connected to a connection electrode of the at least one connection electrode and covers at least part of the connection electrode; and
connection electrodes of the two adjacent light-emitting panels of the plurality of light-emitting panels are electrically connected through conductive protection structures of the two adjacent light-emitting panels.

2. The splice panel assembly of claim 1, wherein the side face of the base substrate comprises at least one first groove; and
a connection electrode of the at least one connection electrode is at least partially embedded in a first groove of the at least one first groove.

3. The splice panel assembly of claim 2, wherein a height difference between a side surface of the connection electrode facing away from the side face of the base substrate and the side face of the base substrate is less than a first height threshold.

4. The splice panel assembly of claim 1, wherein a side surface of one of the at least one connection electrode facing away from the side face of the base substrate comprises at least one of a second protrusion or a second groove; and
a second protrusion of one connection electrode of one light-emitting panel of the two adjacent light-emitting panels is embedded in a second groove of one connection electrode of another light-emitting panel of the two adjacent light-emitting panels.

5. The splice panel assembly of claim 1, wherein in a first direction, a width of the conductive protection structure is greater than a width of the connection electrode, wherein
the first direction is a direction that intersects an extension direction of the connection electrode and is parallel to the side face of the base substrate.

6. The splice panel assembly of claim 1, wherein the conductive protection structure is electrically connected to the connection electrode by a conductive adhesive.

7. The splice panel assembly of claim 1, wherein a side surface of the conductive protection structure facing away from the side face of the base substrate comprises:
at least one of a third protrusion or a third groove; and
a third protrusion of one conductive protection structure of one light-emitting panel of the two adjacent light-emitting panels is embedded in a third groove of one conductive protection structure of another light-emitting panel of the two adjacent light-emitting panels.

8. The splice panel assembly of claim 7, wherein in a direction perpendicular to the side face of the base substrate, at least one of the third protrusion or the third groove of the conductive protection structure does not overlap a connection electrode covered by the conductive protection structure.

9. The splice panel assembly of claim 1, wherein the conductive protection structure comprises:
a first conductive portion and a second conductive portion connected to each other;
the first conductive portion is located on a side of the connection electrode facing away from the side face of the base substrate; and
the second conductive portion is located on and secured to a side of the base substrate facing away from the plurality of light-emitting elements.

10. The splice panel assembly of claim 9, further comprising at least one conductive connection strip, wherein second conductive portions of the two adjacent light-emitting panels are electrically connected by a conductive connection strip of the at least one conductive connection strip.

11. The splice panel assembly of claim 10, wherein the conductive connection strip comprises:
a plurality of conductive regions insulated from each other; and
second conductive portions of different conductive protection structures of one light-emitting panel of the two adjacent light-emitting panels are electrically connected to second conductive portions of different conductive protection structures of another light-emitting panel of the two adjacent light-emitting panels in a one-to-one manner by different conductive regions.

12. The splice panel assembly of claim 11, wherein the conductive connection strip comprises:
an insulating layer and a conductive layer on the insulating layer; and the conductive layer comprises:
the plurality of conductive regions insulated from each other; and
the insulating layer is located on a side of the second conductive portion facing the base substrate, and the conductive layer is located between the insulating layer and the second conductive portion.

13. The splice panel assembly of claim 10, wherein the conductive connection strip is located on a side of the conductive protection structure facing away from a bottom face of the base substrate; and the bottom face of the base substrate is opposite to the front face of the base substrate.

14. The splice panel assembly of claim 1, wherein an insulating structure is disposed between two adjacent conductive protection structures of the at least one conductive protection structure of a same light-emitting panel of the plurality of light-emitting panels.

15. The splice panel assembly of claim 1, wherein the front face of the base substrate is further provided with a plurality of signal lines; and
among the plurality of light-emitting elements, light-emitting elements located in at least one of a same row or a same column are electrically connected to each other by a signal line of the plurality of signal lines; and the plurality of light-emitting elements are electrically connected to the at least one connection electrode by the plurality of signal lines.

16. The splice panel assembly of claim 15, wherein a width of a connection electrode of the at least one connection electrode is greater than a width of a signal line of the plurality of signal lines; and
the width of the connection electrode is a dimension of a short side of the connection electrode; and the width of the signal line is a dimension of a short side of the signal line.

17. The splice panel assembly of claim 15, wherein the plurality of signal lines comprise:
a first signal line, a second signal line and a third signal line; and the connection electrode comprises a first connection electrode and a second connection electrode,
wherein the plurality of light-emitting elements of a same light-emitting panel are sequentially connected in series by the third signal line; a second pole of one of two adjacent light-emitting elements is electrically connected to a first pole of the other one of the two adjacent light-emitting elements by the third signal line; and of the plurality of light-emitting elements, a first pole of a light-emitting element located at a first connection position is electrically connected to the first connection electrode by the first signal line, and a second pole of a light-emitting element located at a last connection position is electrically connected to the second connection electrode by the second signal line; and a connection mode of two adjacent light-emitting panels of the plurality of light-emitting panels comprises at least one of:
a first connection mode which is that first connection electrodes of the two adjacent light-emitting panels are electrically connected to each other;
a second connection mode which is that second connection electrodes of the two adjacent light-emitting panels are electrically connected to each other; or
a third connection mode which is that the second connection electrode of one of the two adjacent light-emitting panels is electrically connected to the first connection electrode of the other one of the two adjacent light-emitting panels.

18. The splice panel assembly of claim 15, wherein the plurality of signal lines comprise a plurality of first signal lines, a plurality of second signal lines and a plurality of third signal lines, wherein
in a same light-emitting panel, light-emitting elements in a same column are connected in series by one of the plurality of third signal lines; of two adjacent light-emitting elements in a same column, a second pole of one light-emitting element is electrically connected to a first pole of another light-emitting element by a third signal line of the plurality of third signal lines; and
of light-emitting elements in a same column, a first pole of a light-emitting element located at a first connection position is electrically connected to a first signal line of the first signal lines, and a second pole of a light-emitting element located at a last connection position is electrically connected to a second signal line of the plurality of second signal lines.

19. A display device, comprising a splice panel assembly, comprising:
a plurality of light-emitting panels, wherein
each of the plurality of light-emitting panels comprises a base substrate; a front face of the base substrate is provided with a plurality of light-emitting elements arranged in an array; a side face of the base substrate is provided with at least one connection electrode; and the plurality of light-emitting elements are electrically connected to the at least one connection electrode, wherein the front face of the base substrate is connected to the side face of the base substrate and not parallel to the side face of the base substrate; and
two adjacent light-emitting panels of the plurality of light-emitting panels are electrically connected to each other by the at least one connection electrode;
wherein the side face of the base substrate is further provided with at least one conductive protection structure corresponding to the at least one connection electrode in a one-to-one manner; a conductive protection structure of the at least one conductive protection structure is electrically connected to a connection electrode of the at least one connection electrode and covers at least part of the connection electrode; and
connection electrodes of the two adjacent light-emitting panels of the plurality of light-emitting panels are electrically connected through conductive protection structures of the two adjacent light-emitting panels.

* * * * *